United States Patent
Itami et al.

(10) Patent No.: US 9,019,333 B2
(45) Date of Patent: Apr. 28, 2015

(54) OPTICAL SCANNING APPARATUS AND IMAGE FORMING APPARATUS UTILIZING A ROTATIONAL POLYGON MIRROR

(71) Applicants: Yukio Itami, Kanagawa (JP); Yoshinori Hayashi, Kanagawa (JP); Naoki Miyatake, Kanagawa (JP); Naoto Watanabe, Kanagawa (JP); Yukihisa Yokoyama, Kanagawa (JP)

(72) Inventors: Yukio Itami, Kanagawa (JP); Yoshinori Hayashi, Kanagawa (JP); Naoki Miyatake, Kanagawa (JP); Naoto Watanabe, Kanagawa (JP); Yukihisa Yokoyama, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/160,930

(22) Filed: Jan. 22, 2014

(65) Prior Publication Data
US 2014/0204166 A1    Jul. 24, 2014

(30) Foreign Application Priority Data

Jan. 22, 2013 (JP) ................................ 2013-008862
Mar. 8, 2013 (JP) ................................ 2013-046837

(51) Int. Cl.
*B41J 2/435* (2006.01)
*B41J 27/00* (2006.01)
*G02B 26/12* (2006.01)

(52) U.S. Cl.
CPC ............ *G02B 26/124* (2013.01); *G02B 26/123* (2013.01)

(58) Field of Classification Search
USPC .......... 347/230, 231, 241, 243, 256, 259–261
See application file for complete search history.

(56) References Cited

U.S. PATENT DOCUMENTS

| | | | |
|---|---|---|---|
| 5,069,515 A | 12/1991 | Itami et al. | |
| 5,680,254 A | 10/1997 | Ueda et al. | |
| 5,726,699 A | 3/1998 | Itami et al. | |
| 5,739,602 A | 4/1998 | Suzuki et al. | |
| 5,769,544 A | 6/1998 | Suzuki et al. | |
| 6,580,186 B1 | 6/2003 | Suzuki et al. | |
| 6,636,253 B2 * | 10/2003 | Nishiguchi et al. | 347/259 |
| 7,884,842 B2 * | 2/2011 | Ishihara | 347/235 |
| RE42,865 E | 10/2011 | Suzuki et al. | |
| 2002/0001118 A1 | 1/2002 | Nakajima et al. | |
| 2002/0130948 A1 | 9/2002 | Itami et al. | |
| 2002/0149666 A1 | 10/2002 | Amada et al. | |
| 2003/0156310 A1 | 8/2003 | Suzuki et al. | |

(Continued)

FOREIGN PATENT DOCUMENTS

| | | |
|---|---|---|
| JP | 10-206778 | 8/1998 |
| JP | 3358420 | 10/2002 |

(Continued)

OTHER PUBLICATIONS

U.S. Appl. No. 13/934,967, filed Jul. 3, 2013.

*Primary Examiner* — Hai C Pham
(74) *Attorney, Agent, or Firm* — Oblon, McClelland, Maier & Neustadt, L.L.P.

(57) ABSTRACT

An optical scanning apparatus includes a light source; and a rotational polygon mirror having N reflecting surfaces, the rotational polygon mirror being configured to reflect a light flux emitted from the light source so that a scanning surface is scanned along a main-scanning direction with reflected from the rotational polygon mirror. A width of the light flux incident on the rotational polygon mirror in a direction corresponding to the main-scanning direction is smaller than a width of each reflecting surface of the rotational polygon mirror in the direction corresponding to the main-scanning direction.

11 Claims, 34 Drawing Sheets

(56) References Cited

U.S. PATENT DOCUMENTS

| | | |
|---|---|---|
| 2003/0160529 A1 | 8/2003 | Suzuki et al. |
| 2003/0206322 A1 | 11/2003 | Atsuumi et al. |
| 2003/0214693 A1 | 11/2003 | Hayashi et al. |
| 2004/0001241 A1 | 1/2004 | Hayashi et al. |
| 2004/0165240 A1 | 8/2004 | Suzuki et al. |
| 2004/0184127 A1 | 9/2004 | Nakajima et al. |
| 2004/0240000 A1 | 12/2004 | Miyatake et al. |
| 2005/0094234 A1 | 5/2005 | Miyatake et al. |
| 2005/0099663 A1 | 5/2005 | Hayashi |
| 2005/0225819 A1 | 10/2005 | Atsuumi et al. |
| 2006/0000990 A1 | 1/2006 | Hayashi et al. |
| 2006/0061847 A1 | 3/2006 | Itami |
| 2006/0203264 A1 | 9/2006 | Miyatake |
| 2006/0208179 A1 | 9/2006 | Itami |
| 2006/0209166 A1 | 9/2006 | Suzuki et al. |
| 2006/0209377 A1 | 9/2006 | Atsuumi et al. |
| 2006/0291026 A1 | 12/2006 | Miyatake |
| 2007/0002417 A1 | 1/2007 | Hirakawa et al. |
| 2007/0030538 A1 | 2/2007 | Hirakawa et al. |
| 2007/0081216 A1 | 4/2007 | Miyatake |
| 2007/0146849 A1 | 6/2007 | Miyatake et al. |
| 2007/0146852 A1 | 6/2007 | Itami |
| 2007/0153349 A1 | 7/2007 | Itami et al. |
| 2007/0215800 A1 | 9/2007 | Miyatake et al. |
| 2007/0216754 A1 | 9/2007 | Miyatake |
| 2008/0062491 A1 | 3/2008 | Nakamura et al. |
| 2008/0062493 A1 | 3/2008 | Miyatake |
| 2008/0068691 A1 | 3/2008 | Miyatake |
| 2008/0174843 A1 | 7/2008 | Masuda et al. |
| 2008/0180772 A1 | 7/2008 | Miyatake et al. |
| 2008/0204539 A1 | 8/2008 | Itami et al. |
| 2009/0073528 A1 | 3/2009 | Miyatake |
| 2009/0168132 A1 | 7/2009 | Miyatake |
| 2009/0231659 A1 | 9/2009 | Masuda et al. |
| 2010/0091083 A1 | 4/2010 | Itami et al. |
| 2011/0063704 A1 | 3/2011 | Miyatake |
| 2012/0056968 A1 | 3/2012 | Imai et al. |
| 2012/0177409 A1 | 7/2012 | Arai et al. |
| 2012/0182367 A1 | 7/2012 | Masuda et al. |
| 2012/0236380 A1 | 9/2012 | Miyatake et al. |
| 2013/0083148 A1 | 4/2013 | Miyatake et al. |
| 2013/0147895 A1 | 6/2013 | Miyatake |
| 2013/0188992 A1 | 7/2013 | Itami |
| 2013/0201536 A1 | 8/2013 | Nakamura et al. |
| 2013/0235143 A1 | 9/2013 | Itami et al. |

FOREIGN PATENT DOCUMENTS

| | | |
|---|---|---|
| JP | 2005-092129 | 4/2005 |
| JP | 2010-122248 | 6/2010 |

\* cited by examiner

-RELATED ART-

| | model1 | model2 | model3 | model4 | model5 | model6 |
|---|---|---|---|---|---|---|
| N | 4 | 4 | 4 | 4 | 4 | 4 |
| $d_{in}$(mm) | 4 | 4 | 4 | 4 | 4 | 4 |
| k | 0 | 0.05 | 0.1 | 0.15 | 0.2 | 0.25 |
| $\theta_{in}$(°) | 80 | 80 | 80 | 80 | 80 | 80 |
| $\theta_s$(°) | 40 | 40 | 40 | 40 | 40 | 40 |
| $\theta_e$(°) | -40 | -40 | -40 | -40 | -40 | -40 |
| $\theta_1$(°) | 15.000 | 15.000 | 15.000 | 15.000 | 15.000 | 15.000 |
| $\theta_2$(°) | 65.000 | 65.000 | 65.000 | 65.000 | 65.000 | 65.000 |
| $d_b$(mm) | 4.000 | 3.600 | 3.200 | 2.800 | 2.400 | 2.000 |
| R(mm) | 6.178 | 5.560 | 4.942 | 4.324 | 3.707 | 3.089 |
| A(mm) | 4.368 | 3.931 | 3.495 | 3.058 | 2.621 | 2.184 |
| x1(mm) | 5.967 | 5.370 | 4.774 | 4.177 | 3.580 | 2.984 |
| y1(mm) | 1.599 | 1.439 | 1.279 | 1.119 | 0.959 | 0.799 |
| x2(mm) | 2.611 | 2.350 | 2.089 | 1.828 | 1.566 | 1.305 |
| y2(mm) | 5.599 | 5.039 | 4.479 | 3.919 | 3.359 | 2.799 |
| b(mm) | -9.208 | -8.287 | -7.366 | -6.445 | -5.525 | -4.604 |

|  | model1 | model2 | model3 | model4 | model5 | model6 |
|---|---|---|---|---|---|---|
| N | 5 | 5 | 5 | 5 | 5 | 5 |
| $d_{in}$(mm) | 4 | 4 | 4 | 4 | 4 | 4 |
| k | 0 | 0.05 | 0.1 | 0.15 | 0.2 | 0.25 |
| $\theta_{in}$(°) | 70 | 70 | 70 | 70 | 70 | 70 |
| $\theta_s$(°) | 40 | 40 | 40 | 40 | 40 | 40 |
| $\theta_e$(°) | -40 | -40 | -40 | -40 | -40 | -40 |
| $\theta_1$(°) | 19.000 | 19.000 | 19.000 | 19.000 | 19.000 | 19.000 |
| $\theta_2$(°) | 51.000 | 51.000 | 51.000 | 51.000 | 51.000 | 51.000 |
| $d_b$(mm) | 4.000 | 3.600 | 3.200 | 2.800 | 2.400 | 2.000 |
| R(mm) | 8.858 | 7.972 | 7.086 | 6.200 | 5.315 | 4.429 |
| A(mm) | 7.166 | 6.450 | 5.733 | 5.016 | 4.300 | 3.583 |
| x1(mm) | 8.375 | 7.538 | 6.700 | 5.863 | 5.025 | 4.188 |
| y1(mm) | 2.884 | 2.595 | 2.307 | 2.019 | 1.730 | 1.442 |
| x2(mm) | 5.574 | 5.017 | 4.460 | 3.902 | 3.345 | 2.787 |
| y2(mm) | 6.884 | 6.195 | 5.507 | 4.819 | 4.130 | 3.442 |
| b(mm) | -8.432 | -7.589 | -6.745 | -5.902 | -5.059 | -4.216 |

|  | model1 | model2 | model3 | model4 | model5 | model6 |
|---|---|---|---|---|---|---|
| N | 6 | 6 | 6 | 6 | 6 | 6 |
| $d_{in}$(mm) | 4 | 4 | 4 | 4 | 4 | 4 |
| k | 0 | 0.05 | 0.1 | 0.15 | 0.2 | 0.25 |
| $\theta_{in}$(°) | 60 | 60 | 60 | 60 | 60 | 60 |
| $\theta_s$(°) | 40 | 40 | 40 | 40 | 40 | 40 |
| $\theta_e$(°) | -40 | -40 | -40 | -40 | -40 | -40 |
| $\theta_1$(°) | 20.000 | 20.000 | 20.000 | 20.000 | 20.000 | 20.000 |
| $\theta_2$(°) | 40.000 | 40.000 | 40.000 | 40.000 | 40.000 | 40.000 |
| $d_b$(mm) | 4.000 | 3.600 | 3.200 | 2.800 | 2.400 | 2.000 |
| R(mm) | 13.299 | 11.969 | 10.639 | 9.310 | 7.980 | 6.650 |
| A(mm) | 11.518 | 10.366 | 9.214 | 8.062 | 6.911 | 5.759 |
| x1(mm) | 12.497 | 11.248 | 9.998 | 8.748 | 7.498 | 6.249 |
| y1(mm) | 4.549 | 4.094 | 3.639 | 3.184 | 2.729 | 2.274 |
| x2(mm) | 10.188 | 9.169 | 8.150 | 7.132 | 6.113 | 5.094 |
| y2(mm) | 8.549 | 7.694 | 6.839 | 5.984 | 5.129 | 4.274 |
| b(mm) | -9.097 | -8.188 | -7.278 | -6.368 | -5.458 | -4.549 |

|  | model1 | model2 | model3 | model4 | model5 | model6 |
|---|---|---|---|---|---|---|
| N | 7 | 7 | 7 | 7 | 7 | 7 |
| $d_{in}$(mm) | 4 | 4 | 4 | 4 | 4 | 4 |
| k | 0 | 0.05 | 0.1 | 0.15 | 0.2 | 0.25 |
| $\theta_{in}$(°) | 55 | 55 | 55 | 55 | 55 | 55 |
| $\theta_s$(°) | 36 | 36 | 36 | 36 | 36 | 36 |
| $\theta_e$(°) | -36 | -36 | -36 | -36 | -36 | -36 |
| $\theta_1$(°) | 19.786 | 19.786 | 19.786 | 19.786 | 19.786 | 19.786 |
| $\theta_2$(°) | 35.214 | 35.214 | 35.214 | 35.214 | 35.214 | 35.214 |
| $d_b$(mm) | 4.000 | 3.600 | 3.200 | 2.800 | 2.400 | 2.000 |
| R(mm) | 16.797 | 15.118 | 13.438 | 11.758 | 10.078 | 8.399 |
| A(mm) | 15.134 | 13.621 | 12.107 | 10.594 | 9.080 | 7.567 |
| x1(mm) | 15.806 | 14.225 | 12.645 | 11.064 | 9.483 | 7.903 |
| y1(mm) | 5.686 | 5.117 | 4.549 | 3.980 | 3.412 | 2.843 |
| x2(mm) | 13.723 | 12.351 | 10.979 | 9.606 | 8.234 | 6.862 |
| y2(mm) | 9.686 | 8.717 | 7.749 | 6.780 | 5.812 | 4.843 |
| b(mm) | -9.913 | -8.922 | -7.931 | -6.939 | -5.948 | -4.957 |

| | model1 | model2 | model3 | model4 | model5 | model6 |
|---|---|---|---|---|---|---|
| N | 8 | 8 | 8 | 8 | 8 | 8 |
| $d_{in}$(mm) | 4 | 4 | 4 | 4 | 4 | 4 |
| k | 0 | 0.05 | 0.1 | 0.15 | 0.2 | 0.25 |
| $\theta_{in}$(°) | 50 | 50 | 50 | 50 | 50 | 50 |
| $\theta_s$(°) | 32 | 32 | 32 | 32 | 32 | 32 |
| $\theta_e$(°) | -32 | -32 | -32 | -32 | -32 | -32 |
| $\theta_1$(°) | 18.500 | 18.500 | 18.500 | 18.500 | 18.500 | 18.500 |
| $\theta_2$(°) | 31.500 | 31.500 | 31.500 | 31.500 | 31.500 | 31.500 |
| $d_b$(mm) | 4.000 | 3.600 | 3.200 | 2.800 | 2.400 | 2.000 |
| R(mm) | 19.494 | 17.544 | 15.595 | 13.646 | 11.696 | 9.747 |
| A(mm) | 18.010 | 16.209 | 14.408 | 12.607 | 10.806 | 9.005 |
| x1(mm) | 18.486 | 16.638 | 14.789 | 12.940 | 11.092 | 9.243 |
| y1(mm) | 6.185 | 5.567 | 4.948 | 4.330 | 3.711 | 3.093 |
| x2(mm) | 16.621 | 14.959 | 13.297 | 11.635 | 9.973 | 8.311 |
| y2(mm) | 10.185 | 9.167 | 8.148 | 7.130 | 6.111 | 5.093 |
| b(mm) | -9.623 | -8.661 | -7.698 | -6.736 | -5.774 | -4.811 |

(a) SCANNING START POSITION (b) SCANNING CENTRAL POSITION (c) SCANNING END POSITION (a)

(b)

(c)

(d)

OPTICAL SCANNING APPARATUS AND IMAGE FORMING APPARATUS UTILIZING A ROTATIONAL POLYGON MIRROR

CROSS-REFERENCE TO RELATED APPLICATIONS

The present application claims priority to and incorporates by reference the entire contents of Japanese Patent Application No. 2013-008862 filed in Japan on Jan. 22, 2013 and Japanese Patent Application No. 2013-046837 filed in Japan on Mar. 8, 2013.

BACKGROUND OF THE INVENTION

1. Field of the Invention

The present invention relates to an optical scanning apparatus and an image forming apparatus.

2. Description of the Related Art

In recording electrophotographic images, image forming apparatuses using laser light have been widely used. The image forming apparatuses have an optical scanning apparatus that scans the front surface of a photosensitive drum with laser light and forms a latent image on the front surface of the drum.

The optical scanning apparatus has a light source, an optical system at the front of a deflector, a rotational polygon mirror, a scanning optical system, and the like. The laser light emitted from the light source is incident on the rotational polygon mirror via the optical system at the front of the deflector and guided to the drum via the scanning optical system after being deflected by the reflecting surface of the rotational polygon mirror. Note that the reflecting surface of the rotational polygon mirror is also called a "deflecting and reflecting surface".

A method for causing the laser light to be incident on the rotational polygon mirror includes an under field type and an over field type. In the following description, the under field type and the over field type will be called an "UF type" and an "OF type", respectively, for the sake of convenience.

According to the UF type, the width of incident light is smaller in size than the length of a deflecting and reflecting surface in a direction corresponding to a main-scanning direction (see, for example, Japanese Laid-open Patent Publication No. 2005-92129). In this case, the incident light is entirely reflected by the deflecting and reflecting surface. In addition, a reduction in the area of a deflecting and reflecting surface has been attempted to increase the speed of optical scanning (see, for example, Japanese Laid-open Patent Publication No. 2010-122248).

According to the OF type, the width of incident light is greater in size than the length of a deflecting and reflecting surface (see, for example, Japanese Laid-open Patent Publication No. 10-206778). In this case, the peripheral portion of the incident light is not incident on the deflecting and reflecting surface.

In recent years, there has been a great demand for the higher speed of image formation and the higher quality of images in image forming apparatuses.

However, with the conventional image forming apparatuses, it is difficult to achieve desired high speed and high quality without increasing their sizes and costs.

Therefore, there is a need to perform optical scanning on a scanning surface at high speed and with high accuracy without increasing a size and a cost.

SUMMARY OF THE INVENTION

It is an object of the present invention to at least partially solve the problems in the conventional technology.

According to an embodiment, there is provided an optical scanning apparatus that includes a light source; and a rotational polygon mirror having N reflecting surfaces, the rotational polygon mirror being configured to reflect a light flux emitted from the light source so that a scanning surface is scanned along a main-scanning direction with reflected from the rotational polygon mirror. A width of the light flux incident on the rotational polygon mirror in a direction corresponding to the main-scanning direction is smaller than a width of each reflecting surface of the rotational polygon mirror in the direction corresponding to the main-scanning direction, and $$R < \frac{d_{in} \times \sqrt{1 + \tan^2 \theta_{in}}}{|\sin\theta_1 - \tan\theta_{in} \times \cos\theta_1 - \sin\theta_2 + \tan\theta_{in} \times \cos\theta_2|}$$

is satisfied in a plane orthogonal to a rotational axis of the rotational polygon mirror,
where R is a radius of a circumscribing circle of the rotational polygon mirror, $d_{in}$ is a width of the light flux incident on the rotational polygon mirror in the direction corresponding to the main-scanning direction, $\theta_{in}$ is an incident angle with respect to a reference axis direction, $\theta_1 = (\theta_{in} + \theta_s)/2 - 360/(2 \times N)$, and $\theta_2 = (\theta_{in} + \theta_e)/2 + 360/(2 \times N)$, where $\theta_s$ is an angle of view at a scanning start position, and $\theta_e$ is an angle of view at a scanning end position in a scanning region.

According to another embodiment, there is provided an image forming apparatus that includes at least one image carrier; and the optical scanning apparatus according to the above embodiment, the optical scanning apparatus being configured to scan the at least one image carrier with the light flux modulated by image information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

First Embodiment

Figure 1:
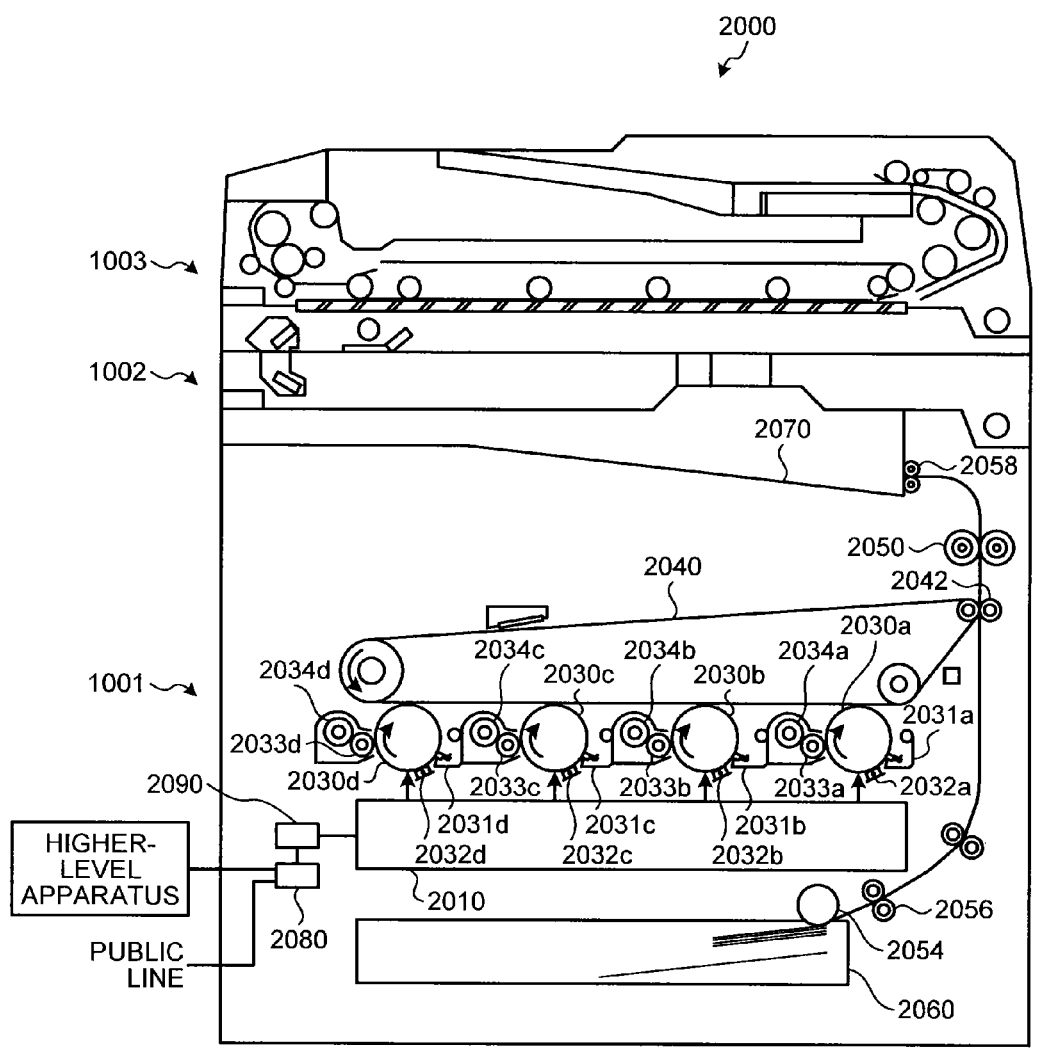
FIG. 1 is a view for illustrating the schematic configuration of a multifunction peripheral according to an embodiment.
Figure 2:
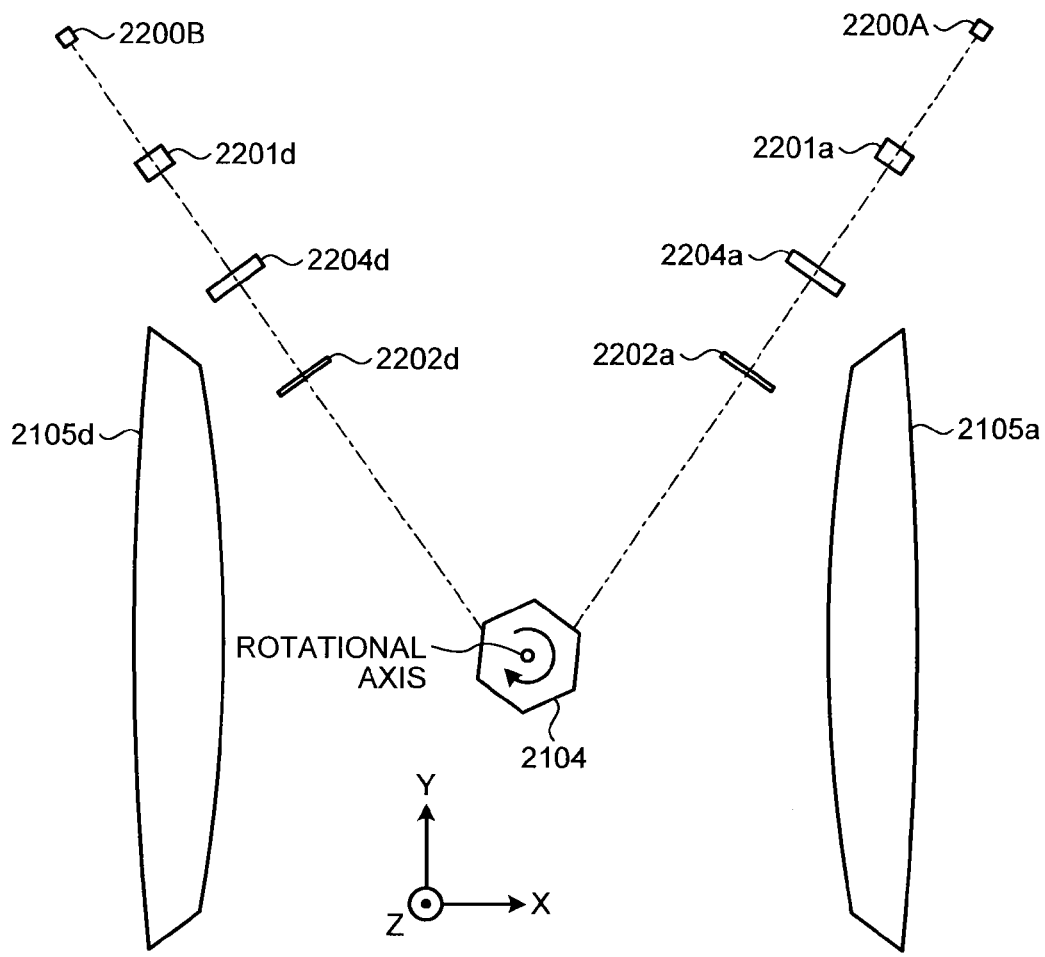
FIG. 2 is a view (1) for illustrating the configuration of an optical scanning apparatus in FIG. 1.
Figure 3:
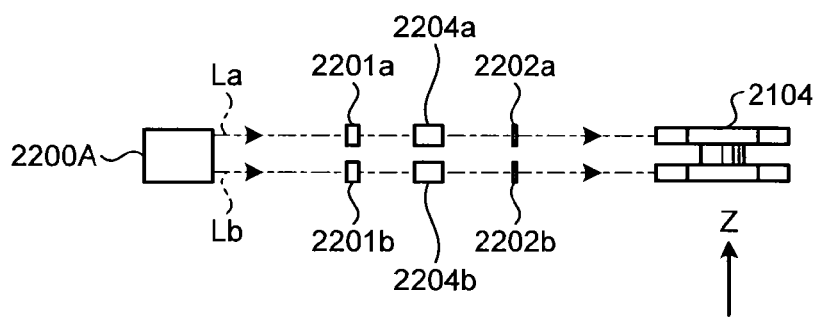
FIG. 3 is a view (2) for illustrating the configuration of the optical scanning apparatus in FIG. 1.
Figure 4:
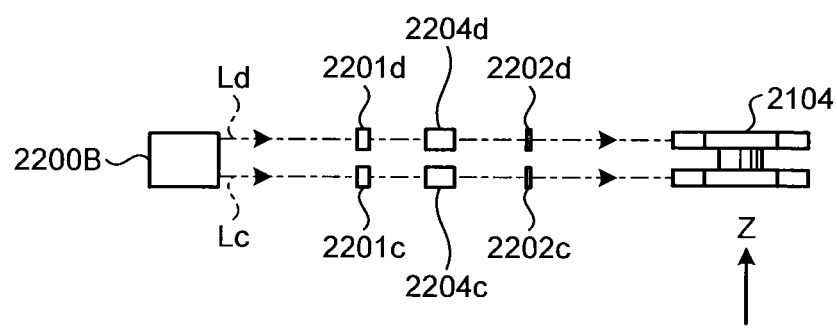
FIG. 4 is a view (3) for illustrating the configuration of the optical scanning apparatus in FIG. 1.
Figure 5:
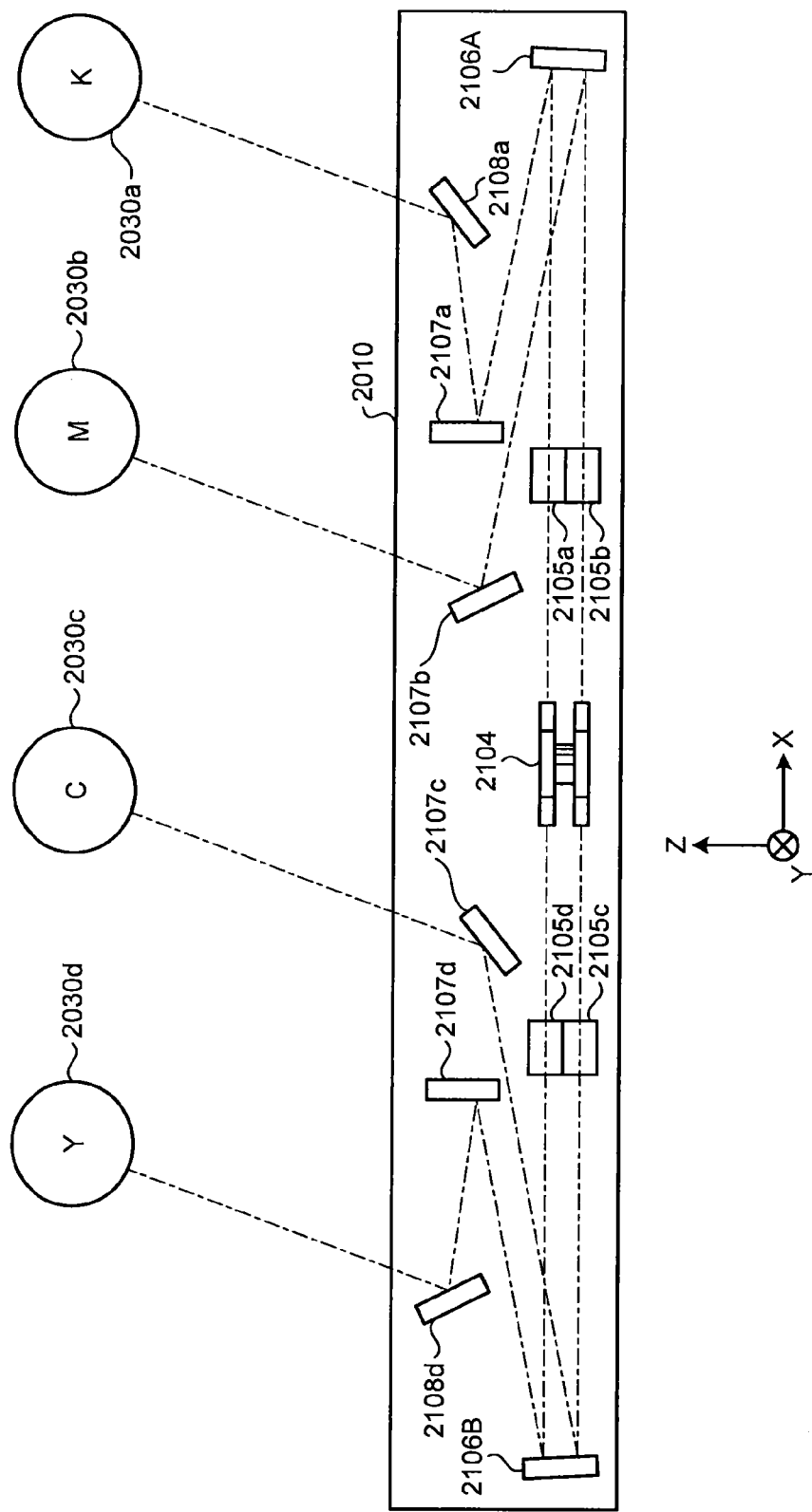
FIG. 5 is a view (4) for illustrating the configuration of the optical scanning apparatus in FIG. 1.

Hereinafter, a description will be given of an embodiment of the present invention with reference to FIGS. 1 to 26. FIG. 1 illustrates the schematic configuration of a multifunction peripheral 2000 serving as an image forming apparatus according to the embodiment.

The multifunction peripheral 2000 functions as a copier, a printer, and a facsimile machine and has a main body apparatus 1001, a reading apparatus 1002, and an automatic document feeding apparatus 1003, and the like.

The main body apparatus 1001 is a tandem multicolor printer that overlaps four colors (black, cyan, magenta, and yellow) together to form a full-color image, and has an optical scanning apparatus 2010, four photosensitive drums 2030a, 2030b, 2030c, and 2030d, four cleaning units 2031a, 2031b, 2031c, and 2031d, four charging devices 2032a, 2032b, 2032c, and 2032d, four developing rollers 2033a, 2033b, 2033c, and 2033d, an intermediate transfer belt 2040, transfer rollers 2042, fixing rollers 2050, a sheet feeding roller 2054, sheet ejecting rollers 2058, a sheet feeding tray 2060, a discharge tray 2070, a communication control device 2080, a printer control device 2090 that collectively controls the above components, and the like.

The reading apparatus 1002 is arranged on the main body apparatus 1001 and reads documents. That is, the reading apparatus 1002 is so-called a scanner apparatus. Here, image information on read documents is transmitted to the printer control device 2090 of the main body apparatus 1001.

The automatic document feeding apparatus 1003 is arranged on the reading apparatus 1002 and feeds placed documents to the reading apparatus 1002. The automatic document feeding apparatus 1003 is generally called an ADF (Auto Document Feeder).

The communication control device 2080 controls bi-directional communication with a higher-level apparatus (for example, a personal computer) via a network or the like and data communication via a public line.

The printer control device 2090 has a CPU, a ROM that stores a program described in a code decodable by the CPU and various data used to perform the program, a RAM serving as a work memory, an A/D conversion circuit that converts analog data into digital data, and the like. Then, the printer control device 2090 transmits image information obtained from the reading apparatus 1002 or image information obtained via the communication control device 2080 to the optical scanning apparatus 2010.

The photosensitive drum 2030a, the charging device 2032a, the developing roller 2033a, and the cleaning unit 2031a are used as a pair and constitute an image forming station (hereinafter also called a "K station" for the sake of convenience) that forms a black image.

The photosensitive drum 2030b, the charging device 2032b, the developing roller 2033b, and the cleaning unit 2031b are used as a pair and constitute an image forming station (hereinafter also called an "M station" for the sake of convenience) that forms a magenta image.

The photosensitive drum 2030c, the charging device 2032c, the developing roller 2033c, and the cleaning unit 2031c are used as a pair and constitute an image forming station (hereinafter also called a "C station" for the sake of convenience) that forms a cyan image.

The photosensitive drum 2030d, the charging device 2032d, the developing roller 2033d, and the cleaning unit 2031d are used as a pair and constitute an image forming station (hereinafter also called a "Y station" for the sake of convenience) that forms a yellow image.

Each of the photosensitive drums has a photosensitive layer on the front surface thereof. The front surface of each of the photosensitive drums is a scanning surface. With a rotation mechanism not illustrated, each of the photosensitive drums rotates in a direction as indicated by an arrow in the plane of FIG. 1.

Each of the charging devices uniformly charges the front surface of the corresponding photosensitive drum.

The optical scanning apparatus 2010 scans each of the front surfaces of the corresponding charged photosensitive drums with light modulated for each of the colors based on multicolor image information (black image information, cyan image information, magenta image information, and the yellow image information) obtained from the printer control device 2090. Thus, a latent image corresponding to the image information is formed on the front surface of each of the photosensitive drums. The latent image formed here moves to the direction of the corresponding developing device with the rotation of the photosensitive drum. Note that the configuration of the optical scanning apparatus 2010 will be described later.

As each of the developing rollers rotates, it is thinly uniformly coated with toner from a corresponding toner cartridge (not illustrated) at the front surface thereof. Then, when the toner on the front surface of each of the developing rollers contacts the front surface of the corresponding photosensitive drum, it moves only to a light-applied portion of the front surface and adheres thereto. That is, each of the developing rollers makes the toner adhere to the latent image formed on the front surface of the corresponding photosensitive drum for elicitation. Here, with the rotation of the photosensitive drum, the toner-adhering image (toner image) moves to the direction of the intermediate transfer belt 2040.

The respective toner images of yellow, magenta, cyan, and black are successively transferred onto the intermediate transfer belt 2040 at a prescribed timing and overlapped together to form a color image.

The sheet feeding tray 2060 stores recording sheets thereon. The sheet feeding roller 2054 is arranged near the sheet feeding tray 2060 and takes out the recording sheets from the sheet feeding tray 2060 one by one. The recording sheet is fed to the gap between the intermediate transfer belt 2040 and the transfer roller 2042 at a prescribed timing. Thus, the color image on the intermediate transfer belt 2040 is transferred onto the recording sheet. The recording sheet having the color image transferred thereto is fed to the fixing rollers 2050.

The fixing rollers 2050 apply heat and pressure to the recording sheet to fix the toner onto the recording sheet. The recording sheet having the toner fixed thereto is fed to the discharge tray 2070 via the sheet ejecting rollers 2058 and successively stuck on the discharge tray 2070.

Each of the cleaning units removes the toner (remaining toner) remaining on the front surface of the corresponding photosensitive drum. The front surface of the photosensitive drum having the remaining toner removed therefrom is returned to a position opposing the corresponding charging device again.

Next, a description will be given of the configuration of the optical scanning apparatus 2010.

As illustrated in FIGS. 2 to 5 as an example, the optical scanning apparatus 2010 has two light sources 2200A and 2200B, four coupling lenses 2201a, 2201b, 2201c, and 2201d, four aperture plates 2202a, 2202b, 2202c, and 2202d, four cylindrical lenses 2204a, 2204b, 2204c, and 2204d, an optical deflector 2104, four scanning lenses 2105a, 2105b, 2105c, and 2105d, eight turning-back mirrors 2106A, 2106B, 2107a, 2107b, 2107c, 2107d, 2108a, and 2108d, a synchronization detecting sensor and a scanning control device not illustrated, and the like. Further, these components are assembled at prescribed positions in an optical housing.

Note here that in an XYZ three-dimensional orthogonal coordinate system, a direction along the longitudinal direction (rotational-axis direction) of each of the photosensitive drums will be described as a Y axis direction and a direction along the rotational axis of the optical deflector 2104 will be described as a Z axis direction. In addition, in the following description, a direction corresponding to a main-scanning direction in each of the optical members and a light flux will be abbreviated as a "main-scanning corresponding direction", and a direction corresponding to a sub-scanning direction will be abbreviated as a "sub-scanning corresponding direction".

The light sources 2200A and 2200B are arranged at positions at which they are distant from each other in the X axis direction. Each of the light sources has two light emitting units and emits two light fluxes separated from each other at least in the Z axis direction.

Here, among the two light fluxes emitted from the light source 2200A, a light flux on the +Z side is called a "light flux La", and a light flux on the −Z side is called a "light flux Lb". In addition, among the two light fluxes emitted from the light source 2200B, a light flux on the +Z side is called a "light flux Ld", and a light flux on the −Z side is called a "light flux Lc".

The coupling lens 2201a is arranged on the light path of the light flux La emitted from the light source 2200A and forms the light flux into a substantially parallel light flux.

The coupling lens 2201b is arranged on the light path of the light flux Lb emitted from the light source 2200A and forms the light flux into a substantially parallel light flux.

The coupling lens 2201c is arranged on the light path of the light flux Lc emitted from the light source 2200B and forms the light flux into a substantially parallel light flux.

The coupling lens 2201d is arranged on the light path of the light flux Ld emitted from the light source 2200B and forms the light flux into a substantially parallel light flux.

The cylindrical lens 2204a is arranged on the light path of the light flux La via the coupling lens 2201a and condenses the light flux in the Z axis direction.

The cylindrical lens 2204b is arranged on the light path of the light flux Lb via the coupling lens 2201b and condenses the light flux in the Z axis direction.

The cylindrical lens 2204c is arranged on the light path of the light flux Lc via the coupling lens 2201a and condenses the light flux in the Z axis direction.

The cylindrical lens 2204d is arranged on the light path of the light flux Ld via the coupling lens 2201d and condenses the light flux in the Z axis direction.

The aperture plate 2202a has an aperture and shapes the light flux La via the cylindrical lens 2204a.

The aperture plate 2202b has an aperture and shapes the light flux Lb via the cylindrical lens 2204b.

The aperture plate 2202c has an aperture and shapes the light flux Lc via the cylindrical lens 2204c.

The aperture plate 2202d has an aperture and shapes the light flux Ld via the cylindrical lens 2204d.

The light flux passing through the aperture of each of the aperture plates is incident on the optical deflector 2104.

The optical system arranged on the optical path between each of the light sources and the optical deflector 2104 is also called an "optical system at the front of the deflector".

The optical deflector 2104 has two-stage rotational polygon mirrors. Each of the rotational polygon mirrors has six mirror surfaces, and each of the mirror surfaces serves as a deflecting and reflecting surface. Further, the first-stage (lower-stage) rotational polygon mirror is arranged to deflect each of the light flux Lb passing through the aperture of the aperture plate 2202b and the light flux Lc passing through the aperture of the aperture plate 2202c, and the second-stage (upper-stage) rotational polygon mirror is arranged to deflect each of the light flux La passing through the aperture of the aperture plate 2202a and the light flux Ld passing through the aperture of the aperture plate 2202d.

Here, the light fluxes La and Lb are deflected to the +X side of the optical deflector 2104, and the light fluxes Lc and Ld are deflected to the −X side of the optical deflector 2104.

The scanning lenses 2105a and 2105b are arranged on the +X side of the optical deflector 2104, and the scanning lenses 2105c and 2105d are arranged on the −X side of the optical deflector 2104.

Further, the scanning lenses 2105a and 2105b are laminated in the Z axis direction. The scanning lens 2105a opposes the second-stage rotational polygon mirror, and the scanning lens 2105b opposes the first-stage rotational polygon mirror. In addition, the scanning lenses 2105c and 2105d are laminated in the Z axis direction. The scanning lens 2105c opposes the first-stage rotational polygon mirror, and the scanning lens 2105d opposes the second-stage rotational polygon mirror.

The light flux La deflected by the optical deflector 2104 is applied to the photosensitive drum 2030a via the scanning lens 2105a, the turning-back mirror 2106A, the turning-back mirror 2107a, and the turning-back mirror 2108a to be formed into a light spot.

The light flux Lb deflected by the optical deflector 2104 is applied to the photosensitive drum 2030b via the scanning lens 2105b, the turning-back mirror 2106A, and the turning-back mirror 2107b to be formed into a light spot.

The light flux Lc deflected by the optical deflector 2104 is applied to the photosensitive drum 2030c via the scanning lens 2105c, the turning-back mirror 2106B, and the turning-back mirror 2107c to be formed into a light spot.

The light flux Ld deflected by the optical deflector 2104 is applied to the photosensitive drum 2030d via the scanning lens 2105d, the turning-back mirror 2106B, the turning-back mirror 2107d, and the turning-back mirror 2108d to be formed into a light spot.

With the rotation of the optical deflector 2104, the light spot on each of the photosensitive drums moves in the longitudinal direction of the photosensitive drum. The moving direction of the light spot at this time corresponds to the "main-scanning direction", and the rotational direction of the photosensitive drum corresponds to the "sub-scanning direction".

The optical system arranged on the light path between the optical deflector 2104 and each of the photosensitive drums is also called a "scanning optical system".

Figure 6:
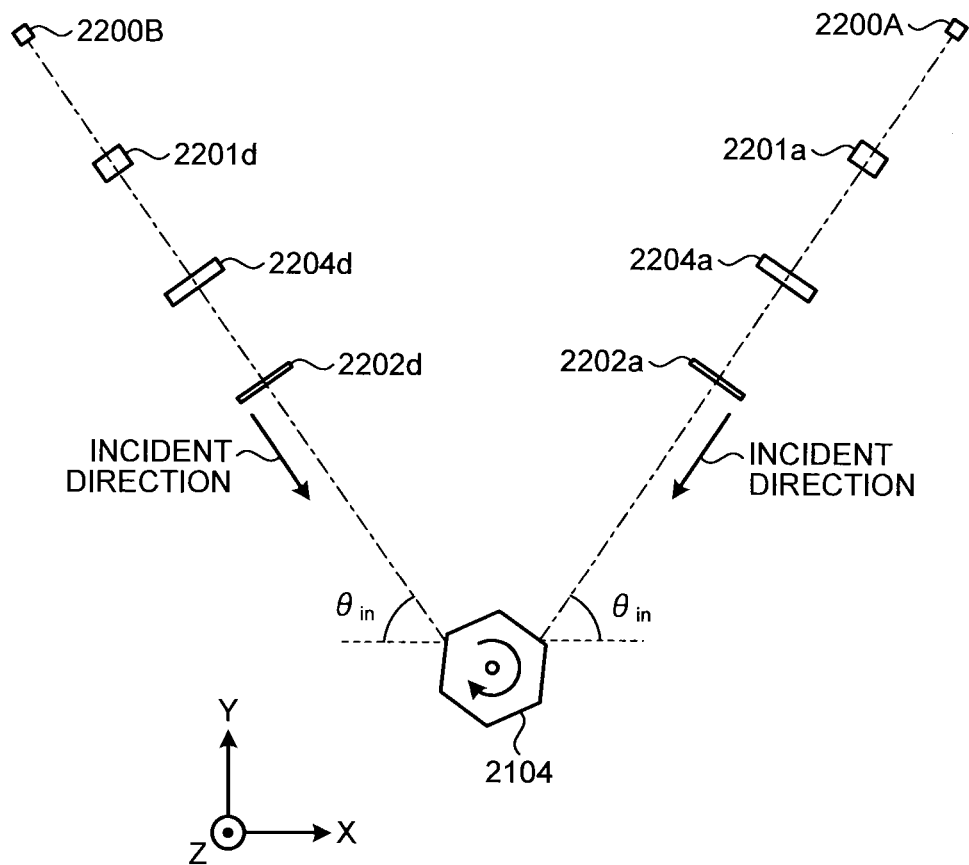
FIG. 6 is a view for illustrating an incident angle $\theta_{in}$ of a light flux incident on an optical deflector.

Here, as illustrated in FIG. 6, when the light flux is orthogonally projected onto a plane orthogonal to the Z axis, the angle formed between the traveling direction of the light flux emitted from the light source and incident on the optical deflector 2104 and the X axis direction (reference-axis direction) is expressed as $\theta_{in}$. The angle is set at 60° ($\theta_{in}$=60°) here.

Figure 7:
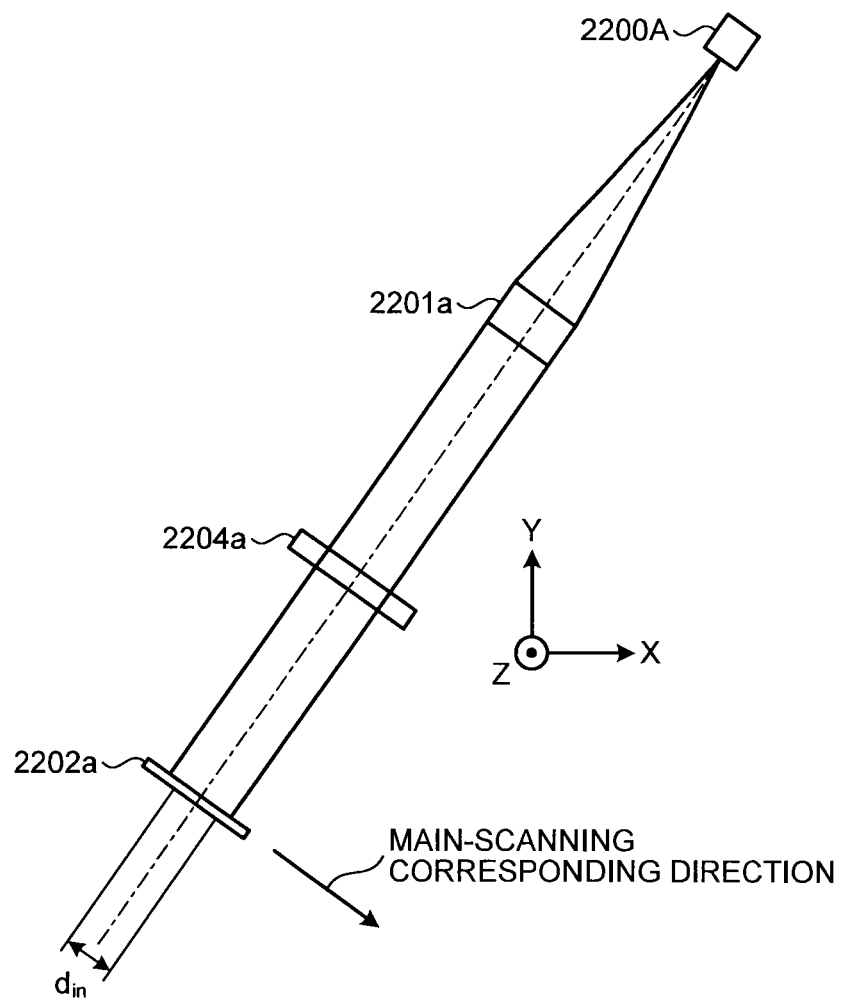
FIG. 7 is a view for illustrating a width $d_{in}$ of the light flux incident on the optical deflector.

In addition, as illustrated in FIG. 7, the width of the light flux passing through the aperture of the aperture plate in the main-scanning corresponding direction is expressed as $d_{in}$. The light flux is incident on the optical deflector 2104. The width is set at 4 mm ($d_{in}$=4 mm) here.

Figure 8:
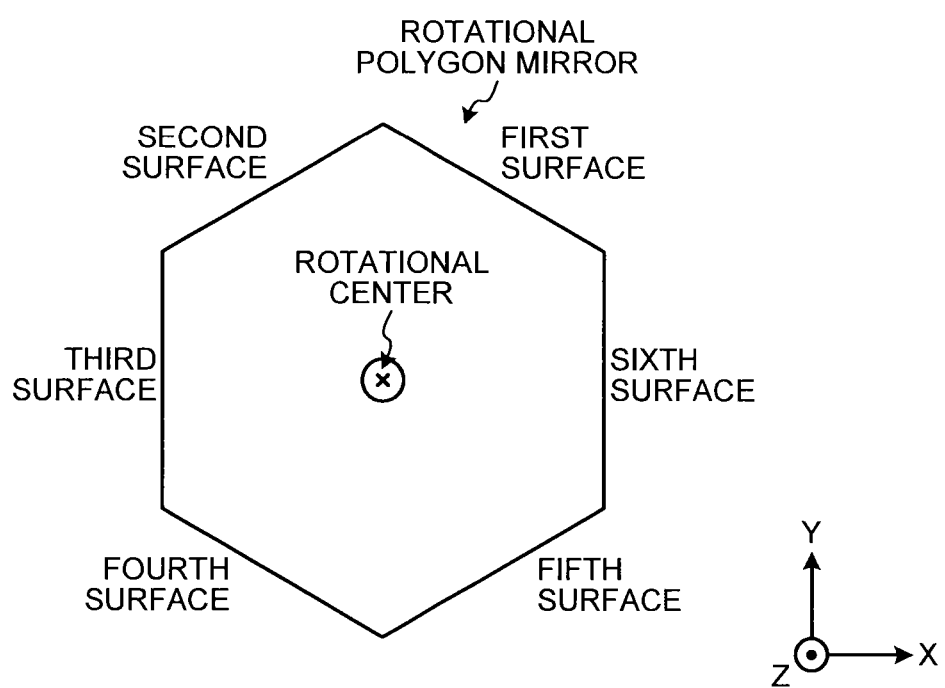
FIG. 8 is a view for illustrating first to sixth surfaces.

Note that the six deflecting and reflecting surfaces are respectively expressed as first to sixth surfaces counterclockwise when they are required to be distinguished from each another (see FIG. 8).

Next, with reference to FIGS. 9 to 11, a description will be given of the light flux (hereinafter abbreviated as the "incident light flux") emitted from the light source 2200A and incident on the optical deflector 2104 and the light flux (hereinafter abbreviated as the "scanning light flux") deflected by the optical deflector 2104 and directed to the scanning region of a corresponding photosensitive drum. Here, the light flux reflected by the first surface of the rotational polygon mirror is directed to the scanning region of the corresponding photosensitive drum.

Figure 9:
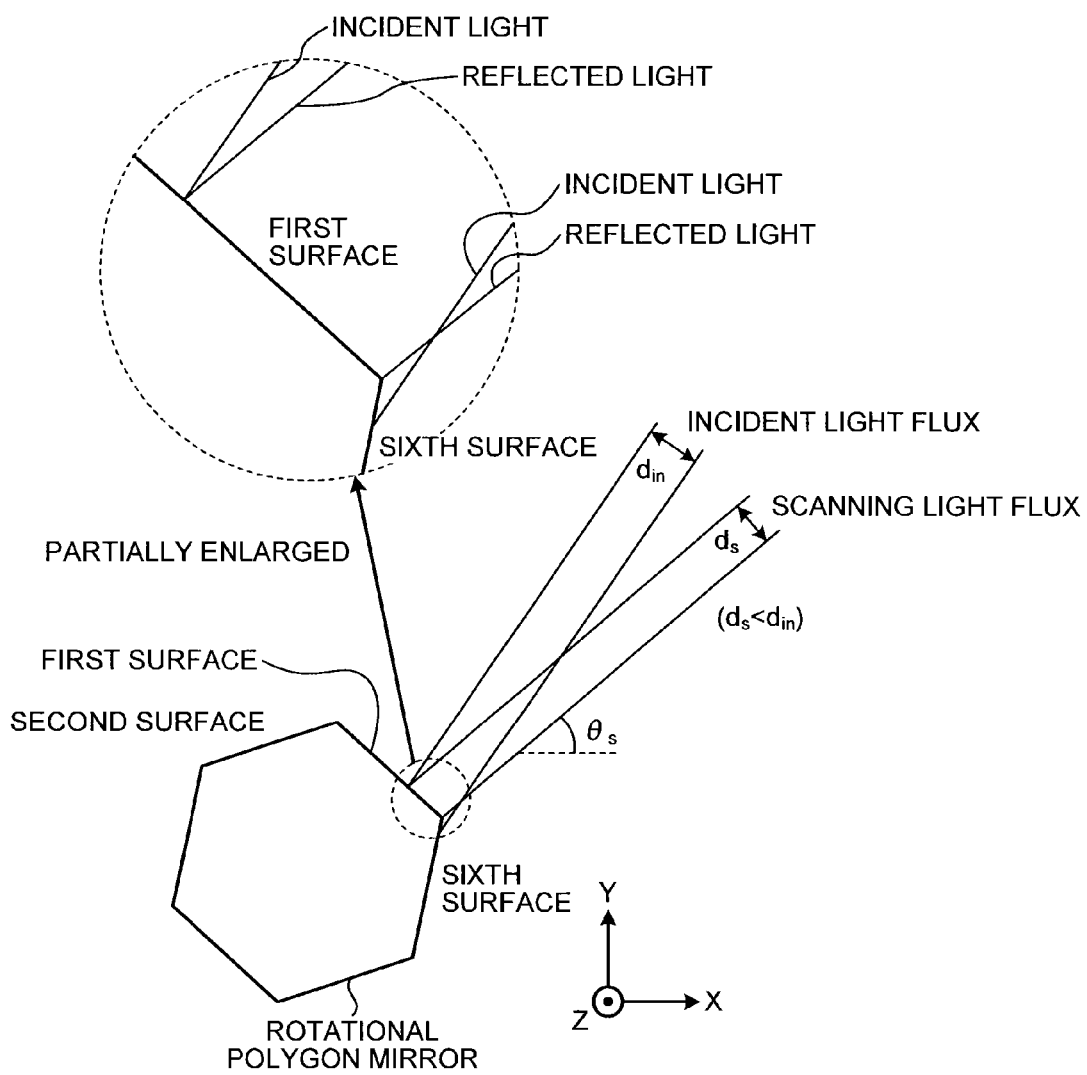
FIG. 9 is a view for illustrating an incident light flux and a scanning light flux with respect to a rotational polygon mirror at a timing at which the scanning light flux is directed to a scanning start position in a scanning region.

FIG. 9 illustrates the incident light flux and the reflected light flux with respect to the rotational polygon mirror at a timing at which the scanning light flux is directed to a scanning start position in the scanning region. At this time, the incident light flux is set such that it is not entirely incident on the first surface of the rotational polygon mirror but is partially incident on the sixth surface. Therefore, the width $d_s$ of the scanning light flux becomes smaller than the width $d_{in}$ of the incident light flux in the main-scanning corresponding direction. That is, the incident light flux is partially "rejected" (reflected in another direction) as not the scanning light flux by the optical deflector 2104. In this case, a ratio of the rejected light to the original incident light flux (hereinafter, a "rejection ratio") k is expressed by $(d_{in}-d_s)/d_{in}$.

At this time, the angle $\theta_s$ formed between the traveling direction of the scanning light flux and the X axis direction is set at 40°. The angle $\theta_s$ is an angle of view at the timing at which the scanning light flux is directed to the scanning start position in the scanning region.

Figure 10:
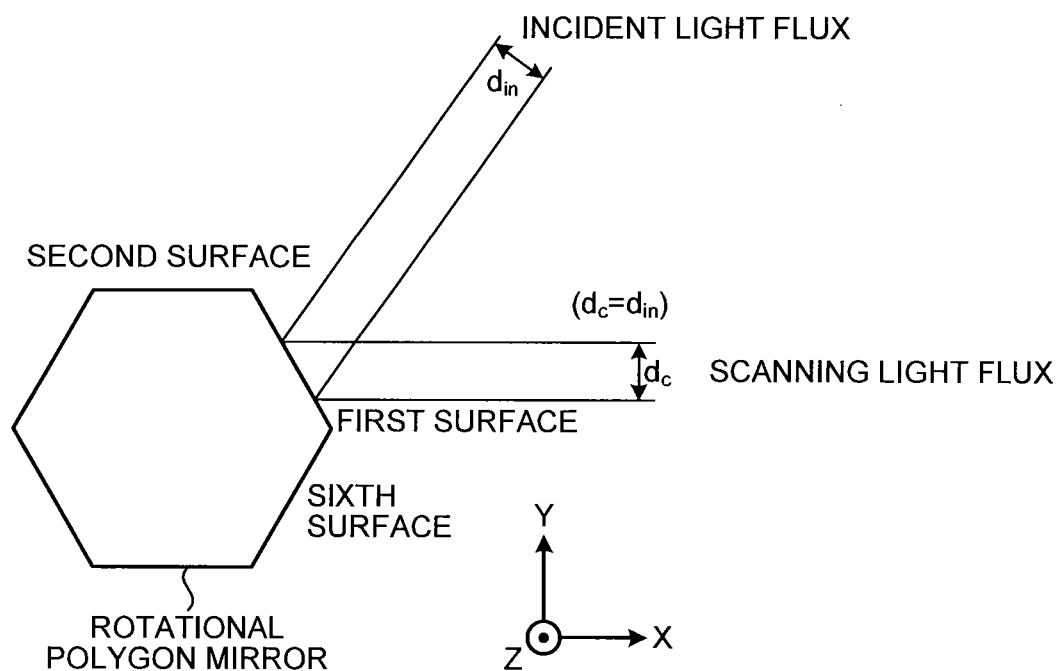
FIG. 10 is a view for illustrating the incident light flux and the scanning light flux with respect to the rotational polygon mirror at a timing at which the scanning light flux is directed to a central position in the scanning region.

FIG. 10 illustrates the incident light flux and the scanning light flux with respect to the rotational polygon mirror at a timing at which the scanning light flux is directed to a central position in the scanning region. At this time, the incident light flux is set such that it is entirely incident on the first surface of the rotational polygon mirror. Therefore, the width $d_c$ of the scanning light flux is the same as the width $d_{in}$ of the incident light flux in the main-scanning corresponding direction. That is, the incident light flux is not "rejected" by the optical deflector 2104.

Figure 11:
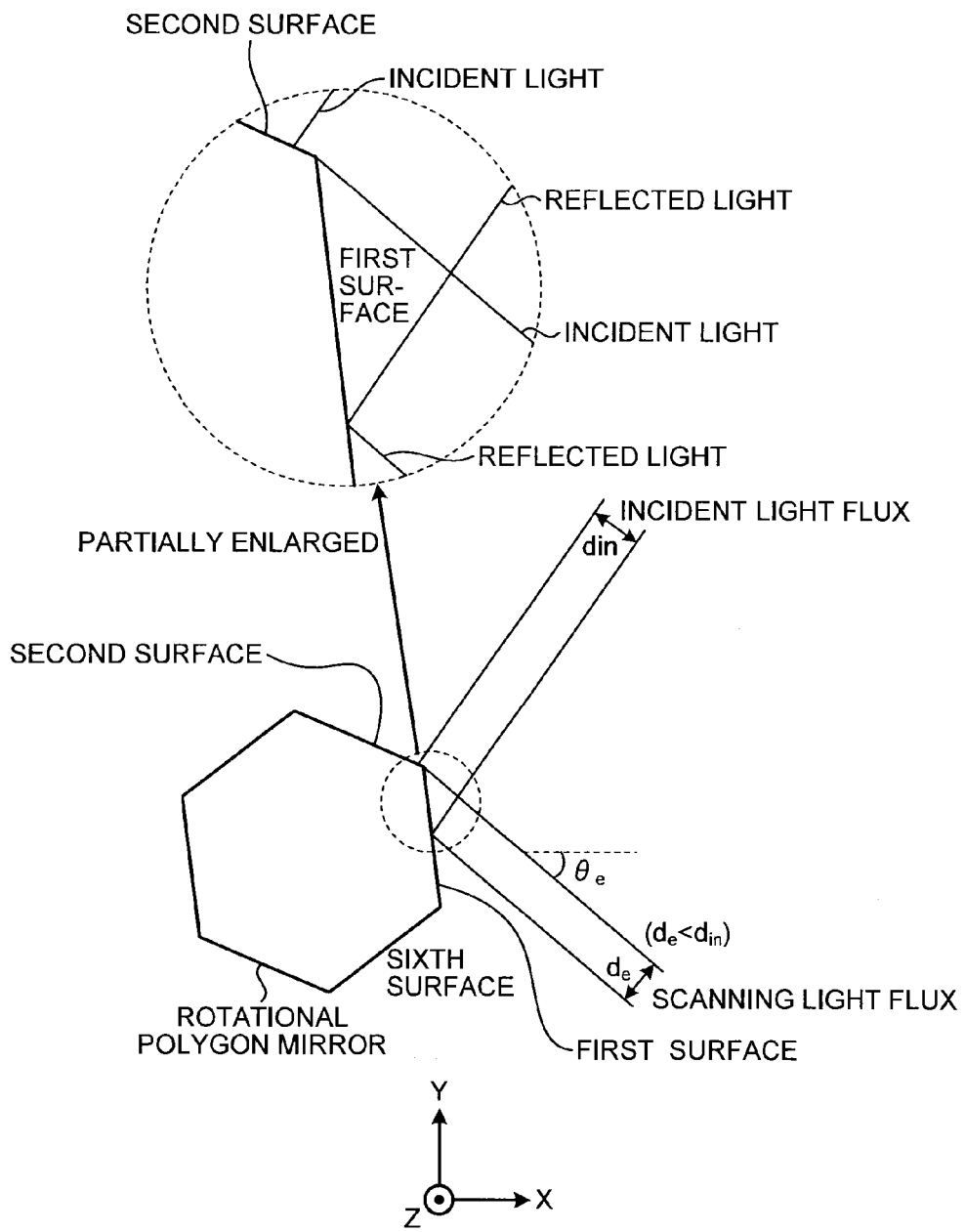
FIG. 11 is a view for illustrating the incident light flux and the scanning light flux with respect to the rotational polygon mirror at a timing at which the scanning light flux is directed to a scanning end position in the scanning region.

FIG. 11 illustrates the incident light flux and the reflected light flux with respect to the rotational polygon mirror at a timing at which the scanning light flux is directed to a scanning end position in the scanning region. At this time, the incident light flux is set such that it is not entirely incident on the first surface of the rotational polygon mirror but is partially incident on the second surface. Therefore, the width $d_e$ of the scanning light flux becomes smaller than the width $d_{in}$ of the incident light flux in the main-scanning corresponding direction. That is, the incident light flux is partially "rejected" by the optical deflector 2104. In this case, the rejection ratio k is expressed by $(d_{in}-d_e)/d_{in}$.

At this time, the angle $\theta_e$ formed between the traveling direction of the scanning light flux and the X axis direction is set at −40.0°. The angle $\theta_e$ is an angle of view at the timing at which the scanning light flux is directed to the scanning end position in the scanning region.

$|\theta_s|+|\theta_e|$ indicates an angle corresponding to so-called a scanning angle of view and is set at 80° here.

The scanning start position in the scanning region of the photosensitive drum corresponds to an end on one side of the scanning region in the main-scanning direction, and the scanning end position in the scanning region of the photosensitive drum corresponds to an end on the other side of the scanning region in the main-scanning direction.

Note that the light flux emitted from the light source 2200B and incident on the optical deflector 2104 is set just like the light flux emitted from the light source 2200A.

Figure 12:
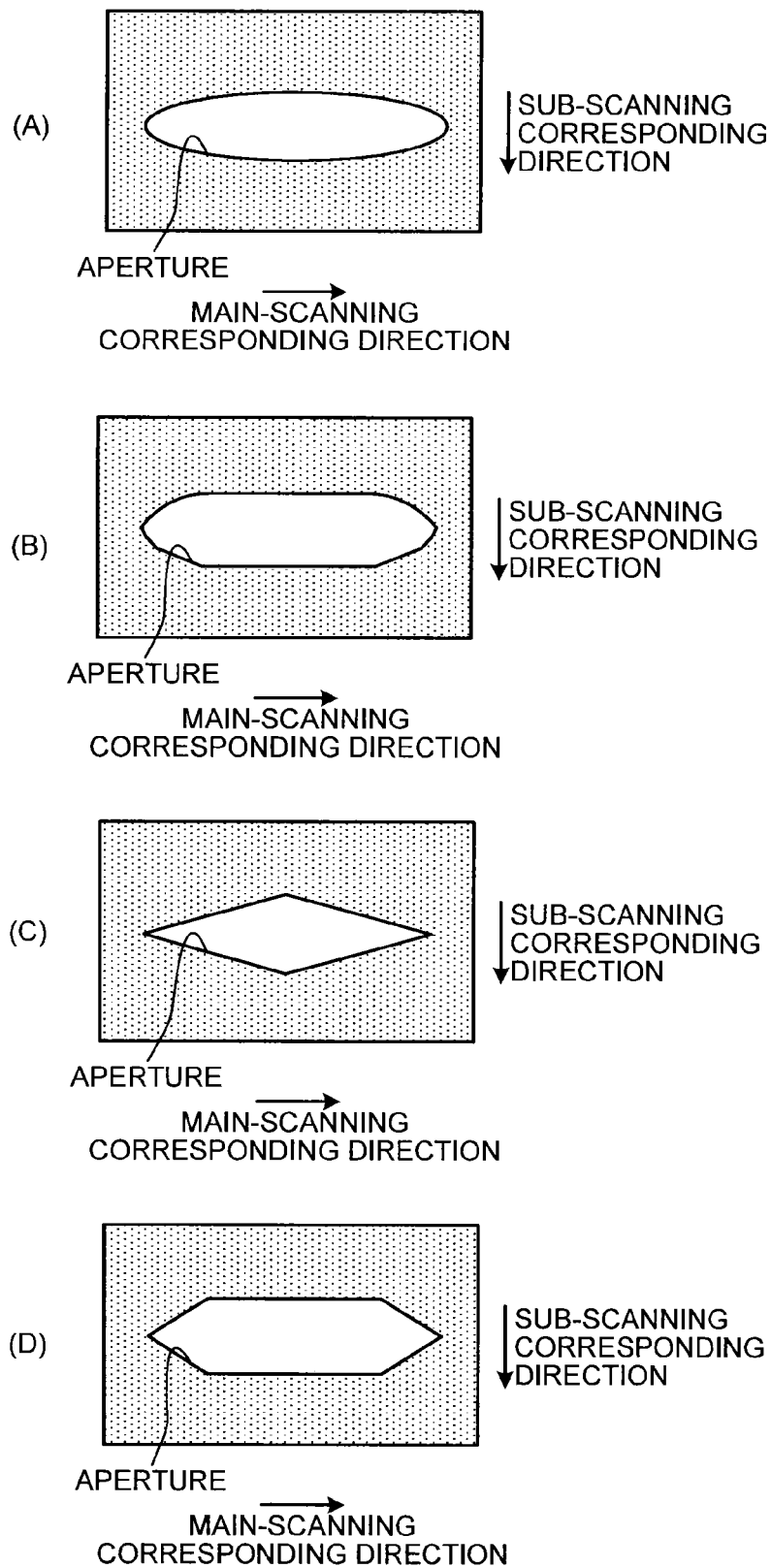
FIG. 12 illustrates examples of an aperture plate in the embodiment.

In FIG. 12, (A) to (D) exemplify aperture plates that may be used as the aperture plates in the embodiment. The apertures of the aperture plates in the embodiment have a shape in which a length (aperture width) in the sub-scanning corresponding direction becomes smaller at the both-end portions thereof in the main-scanning corresponding direction than at the central portion thereof in the main-scanning corresponding direction. In this case, differences in the light amount and the spot diameter between the both-end portions and the central portion in the scanning region may be reduced.

Figure 13:
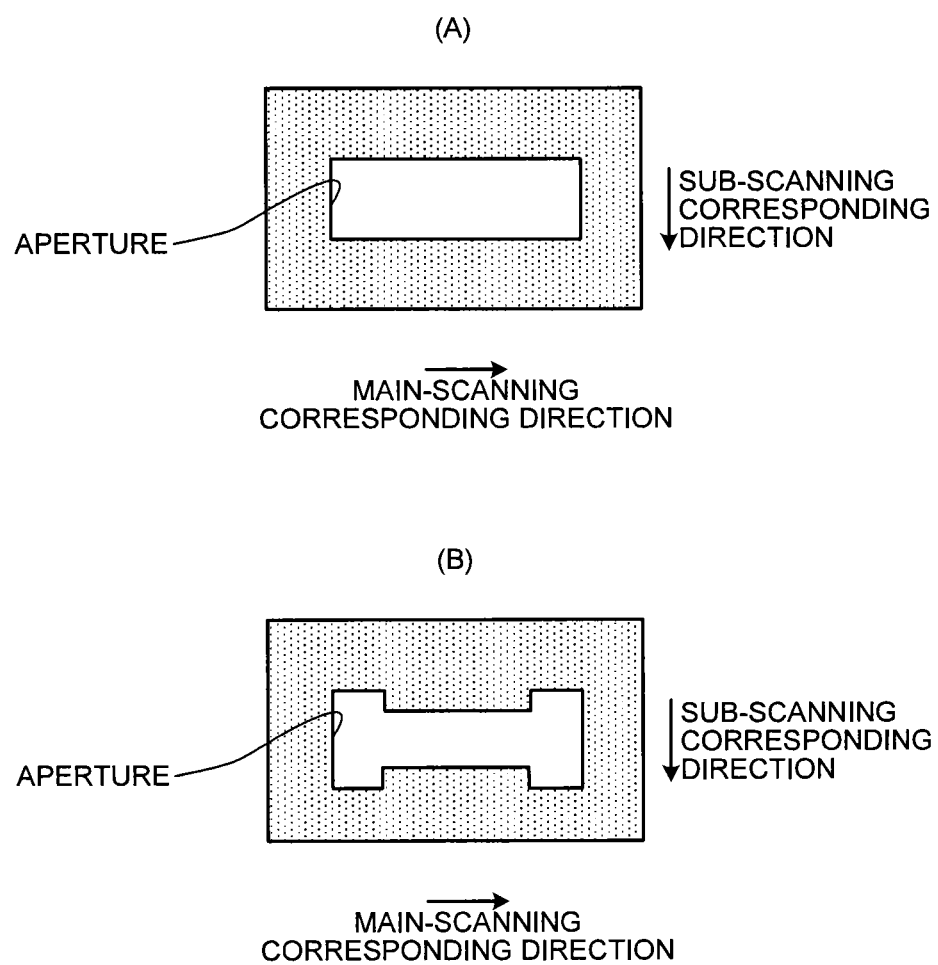
FIG. 13 illustrates examples of a conventional aperture plate.

Note that as comparative examples, (A) of FIG. 13 exemplifies an aperture plate used in a conventional UF-type optical scanning apparatus and (B) of FIG. 13 exemplifies an aperture plate used in a conventional OF-type optical scanning apparatus.

Next, a description will be given of a process for deriving the size of the rotational polygon mirror in the embodiment. Here, the embodiment uses an xy coordinate system in which the center of the rotational polygon mirror serves as an origin in a plane orthogonal to the Z axis direction. An x coordinate value indicates a position in the X axis direction, and a y coordinate value indicates a position in the Y axis direction. In addition, the radius of a circle circumscribing the rotational polygon mirror is expressed as R, the radius of a circle inscribing the rotational polygon mirror is expressed as A, and the number of the mirror surfaces of the rotational polygon mirror is expressed as N. Moreover, the light flux reflected by the first surface of the rotational polygon mirror is directed to the scanning region of a corresponding photosensitive drum.

Figure 14:
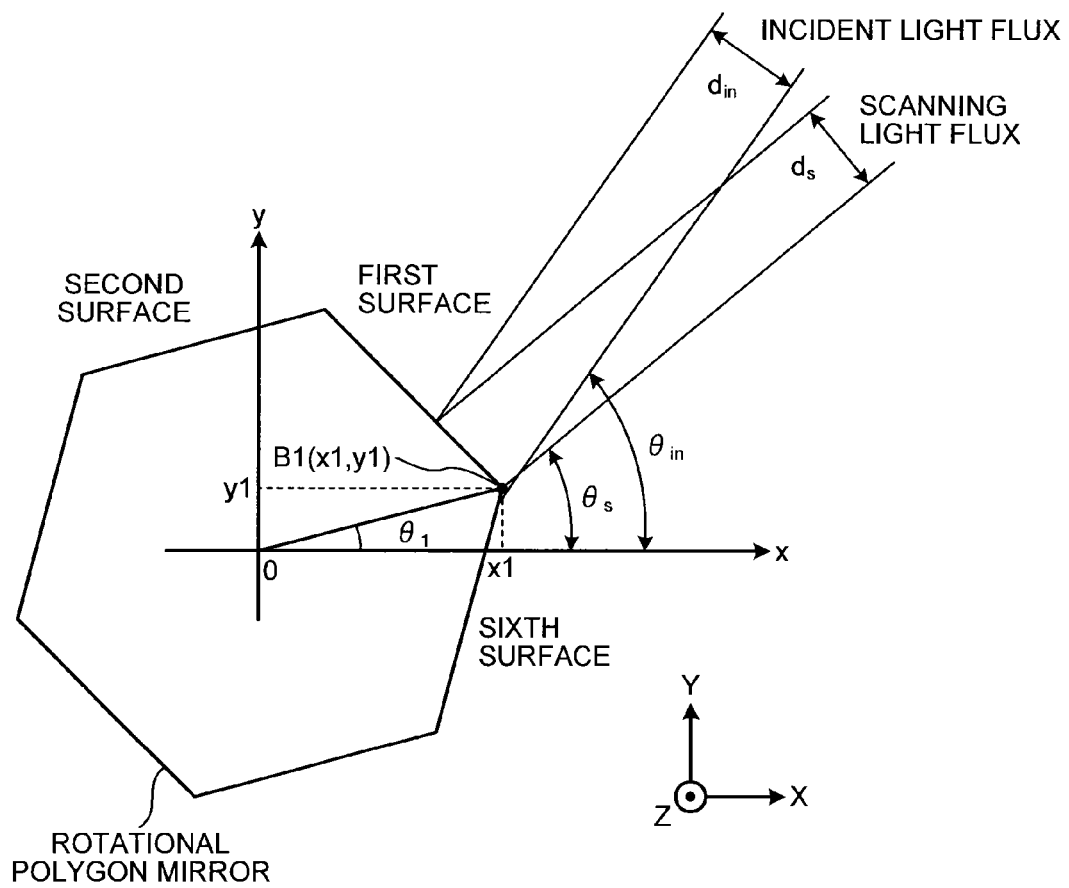
FIG. 14 is a view for illustrating B1(x1, y1) and $\theta_1$.

Further, coordinate values in the xy coordinate system at a boundary portion B1 between the first surface and the sixth surface at the timing at which the scanning light flux is directed to the scanning start position in the scanning region are set at (x1, y1) (see FIG. 14). At this time, the inclination angle of a line segment connecting the origin and the boundary portion B1 together relative to the X axis direction is expressed as $\theta_1$. In the xy coordinate system, the length of the line segment connecting the origin and the boundary portion B1 together is R.

Figure 15:
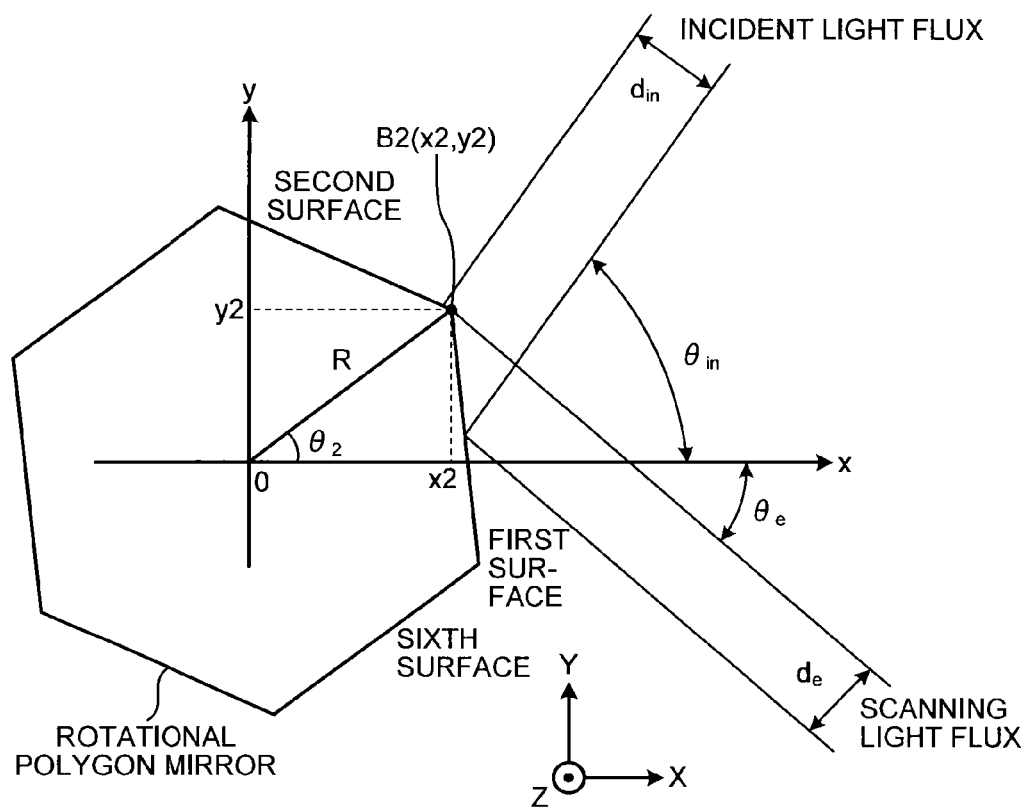
FIG. 15 is a view for illustrating B2(x2, y2) and $\theta_2$.

Furthermore, coordinate values in the xy coordinate system at a boundary portion B2 between the first surface and the second surface at the timing at which the scanning light flux is directed to the scanning end position in the scanning region are set at (x2, y2) (see FIG. 15). At this time, the inclination angle of a line segment connecting the origin and the boundary portion B2 together relative to the X axis direction is expressed as $\theta_2$.

Figure 16:
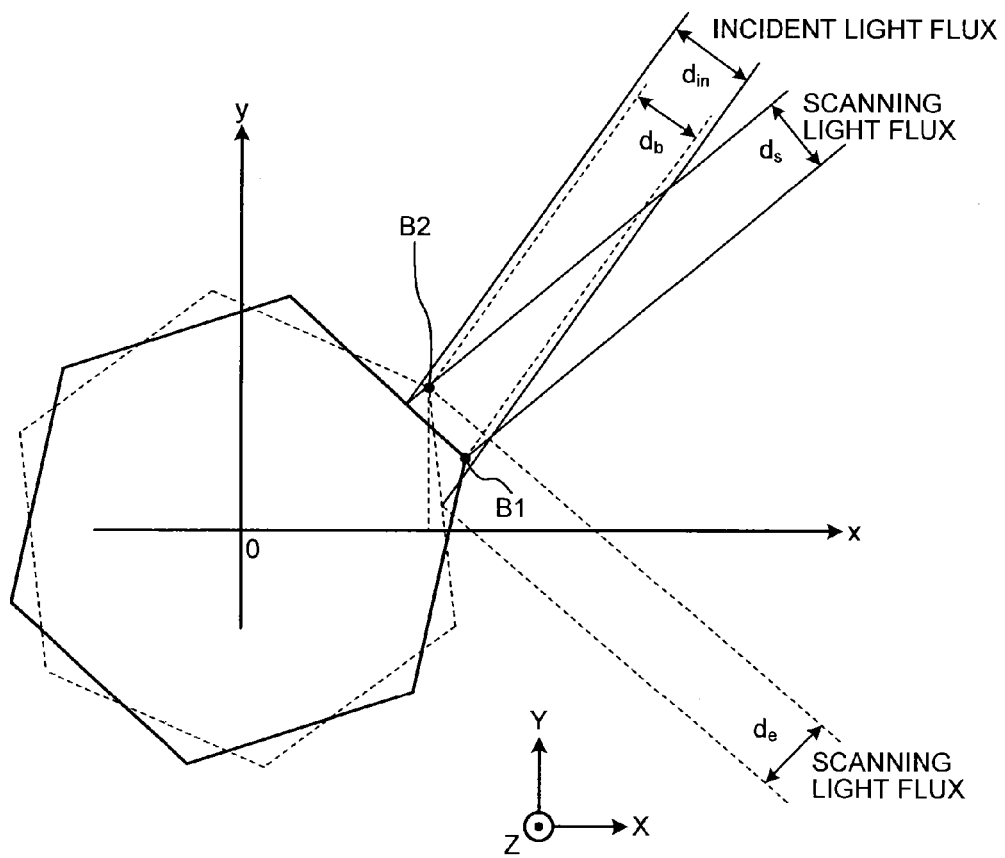
FIG. 16 is a view for illustrating $d_b$.

In addition, the width of the light flux incident on the region between the boundary portion B1 and the boundary portion B2 in the main-scanning corresponding direction is expressed as $d_b$ (see FIG. 16).

The coordinate x1 may be given by the following expression (1).

$$x1 = R\cos\theta_1 \tag{1}$$

The coordinate y1 may be given by the following expression (2).

$$y1 = R\sin\theta_1 \tag{2}$$

$\theta_1$ may be given by the following expression (3).

$$\theta_1 = (\theta_{in}+\theta_s)/2 - 360/(2\times N) \tag{3}$$

The coordinate x2 may be given by the following expression (4).

$$x2 = R\cos\theta_2 \tag{4}$$

The coordinate y2 may be given by the following expression (5).

$$y2 = R\sin\theta_2 \tag{5}$$

$\theta_2$ may be given by the following expression (6).

$$\theta_2 = (\theta_{in}+\theta_e)/2 + 360/(2\times N) \tag{6}$$

A line passing through the boundary portion B2 and parallel to the traveling direction of the incident light flux may be given by the following expression (7).

$$y = \tan\theta_{in} \times x + b \tag{7}$$

b in the above expression (7) is given by the following expression (8).

$$b = R\sin\theta_2 - \tan\theta_{in} \times R\cos\theta_2 \tag{8}$$

The distance d between the boundary portion B1 and the line of the above expression (7) is given by the following expression (9).

$$d = \frac{|y1 - \tan\theta_{in} \times x1 - b|}{\sqrt{1+\tan^2\theta_{in}}} \tag{9}$$

When the above expressions (1), (2), and (8) are substituted into the above expression (9), the following expression (10) may be given.

$$d = \frac{|R\sin\theta_1 - \tan\theta_{in} \times R\cos\theta_1 - (R\sin\theta_2 - \tan\theta_{in} \times R\cos\theta_2)|}{\sqrt{1+\tan^2\theta_{in}}} \tag{10}$$

$$= \frac{|R(\sin\theta_1 - \tan\theta_{in} \times \cos\theta_1 - \sin\theta_2 + \tan\theta_{in} \times \cos\theta_2)|}{\sqrt{1+\tan^2\theta_{in}}}$$

Based on the above expression (10), the following expression (11) may be given.

$$R = \frac{d \times \sqrt{1+\tan^2\theta_{in}}}{|\sin\theta_1 - \tan\theta_{in} \times \cos\theta_1 - \sin\theta_2 + \tan\theta_{in} \times \cos\theta_2|} \tag{11}$$

When the radius of the circle circumscribing the rotational polygon mirror is R under $d=d_{in}$ in the above expression (11), the incident light flux is entirely reflected by the first surface at both the timing at which the scanning light flux is directed to the scanning start position in the scanning region and the timing at which the scanning light flux is directed to the scanning end position in the scanning region. On the other hand, when the radius of the circle circumscribing the rotational polygon mirror is R under $d<d_{in}$, the incident light flux is partially "rejected" at the timing at which the scanning light flux is directed to the scanning start position or at the timing at which the scanning light flux is directed to the scanning end position. That is, the following expression (12) is a conditional expression where the incident light flux is partially "rejected" at the timing at which the scanning light flux is directed to the scanning start position or at the timing at which the scanning light flux is directed to the scanning end position.

$$R < \frac{d_{in} \times \sqrt{1 + \tan^2\theta_{in}}}{|\sin\theta_1 - \tan\theta_{in} \times \cos\theta_1 - \sin\theta_2 + \tan\theta_{in} \times \cos\theta_2|} \quad (12)$$

Meanwhile, when the incident light flux is partially "rejected", there is a likelihood that the light amount of the scanning light flux reduces and the concentration of an image declines. In this case, by correcting the light amount to increase the output of the light source at a corresponding scanning timing, it is possible to maintain the uniformity of the concentration of the image. Note that since the light intensity of the laser light is close to the Gaussian distribution, the light amount of the scanning light flux does not reduce in proportion to the rejection ratio k. However, the smaller the rejection ratio k, the easier the correction of the light amount becomes. Specifically, when the rejection ratio k is less than or equal to 0.2, it is easy to perform the correction of the light amount.

Conventionally, the laser light passing through an fθ lens or an fθ mirror has shading characteristics in which the beam intensity is different depending on an image height. It has been known that the shading characteristics of the laser light is generally 10-odd % (see, for example, Japanese Laid-open Patent Publication No. 2011-198919). Note that the image height corresponds to a position in the main-scanning direction of the photosensitive drum and is based on the center of the photosensitive drum.

A difference in the beam intensity occurs due to the fact that the reflectance and the transmittance (i.e., light use efficiency) of an optical element such as a glass, a lens, and a mirror through which the laser light emitted from the light source passes until reaching the scanning surface are different depending on the incident angle of the laser light and that the thickness of the fθ lens is different depending on the image height.

Since the transmittance of the optical lens reduces with an increase in the image height, the light amount of the laser light emitted from the light source is corrected to suit the image height such that an exposure is performed with a light amount having the same intensity as that of the position of an image height of zero at any image height position. Such a correction is called a "shading correction".

In the embodiment, since the reduction in the light amount due to the rejection of the incident light flux is superimposed on the conventional shading characteristics, the shading correction considering the reduction in the light amount due to the rejection of the incident light flux is required.

Conventionally, an eight-bit DAC (D/A converter) is used in the shading correction to allow the correction of the light amount in units of 0.2% within the range of ±25%. In principle, it is possible to widen the correction range with an increase in the number of the bits of the DAC, but a high cost is caused instead. When the rejection ratio is 0.2, the reduction (10-odd %) in the light amount due to the rejection of the incident light flux is newly added, whereby the correction range becomes 20-odd %. However, within the range, it is possible to perform the conventional shading correction without causing a high cost. Therefore, it is preferable to set the rejection ratio at less than or equal to 0.2.

In addition, the wider the range of the shading correction, the greater the control range of the light amount per scanning becomes. Therefore, a current for driving a light-emitting element is required to be increased to deal with a reduction in the light amount at a scanning end. The use of the light-emitting element having a high output may respond to this, but a high cost is caused instead. On the other hand, when a conventional light-emitting element is used, there is a likelihood that its service life is shortened with an extreme increase in the light amount and thus an additional increase in the light amount is preferably maintained at about 10-odd %. Therefore, it is preferable to set the rejection ratio at less than or equal to 0.2.

Moreover, in order to align the scanning start position at image formation, a synchronization detecting sensor is provided in the embodiment. Generally, the synchronization detecting sensor is provided such that it has an angle of view about several to 10° outside an angle of view at scanning start. However, in the embodiment, the light amount reduces at a rate of 2 to 3% relative to an angle of view of 1° due to the rejection of the incident light flux, and a reduction in the light amount of about 10 to 30-odd % occurs at a synchronization detecting position. It is possible to respond to the reduction in the light amount with an increase in the sensitivity of the synchronization detecting sensor, but a high cost is caused instead. On the other hand, when a conventional synchronization detecting sensor and a light-emitting element are used, it is preferable to set the reduction in the light amount at the synchronization detecting position at less than or equal to 50% and maintain the reduction in the light amount at the scanning end of the image formation at about 10-odd %. Therefore, it is preferable to set the rejection ratio at less than or equal to 0.2.

When the rejection ratio k is the same between the timing at which the scanning light flux is directed to the scanning start position and the timing at which the scanning light flux is directed to the scanning end position, $d_b$ in FIG. 16 is $(1-2k)d_{in}$. In view of this, when $(1-2k)d_{in}$ is substituted into d in the above expression (11), the following expression (13) is given.

$$R = \frac{(1 - 2k)d_{in} \times \sqrt{1 + \tan^2\theta_{in}}}{|\sin\theta_1 - \tan\theta_{in} \times \cos\theta_1 - \sin\theta_2 + \tan\theta_{in} \times \cos\theta_2|} \quad (13)$$

Figures 17, 18:
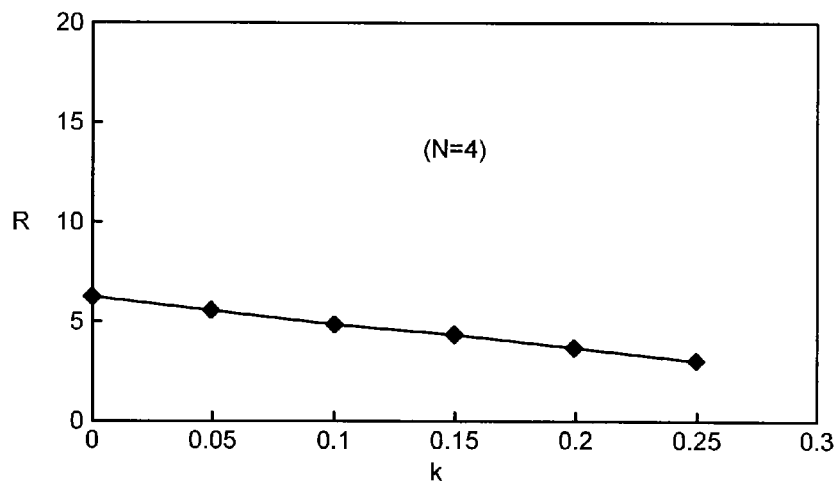
FIG. 17 is a table (1) for illustrating the relationship between a rejection ratio k and the size of the rotational polygon mirror when N=4.
FIG. 18 is a graph (2) for illustrating the relationship between the rejection ratio k and the size of the rotational polygon mirror when N=4.
Figures 19, 20:
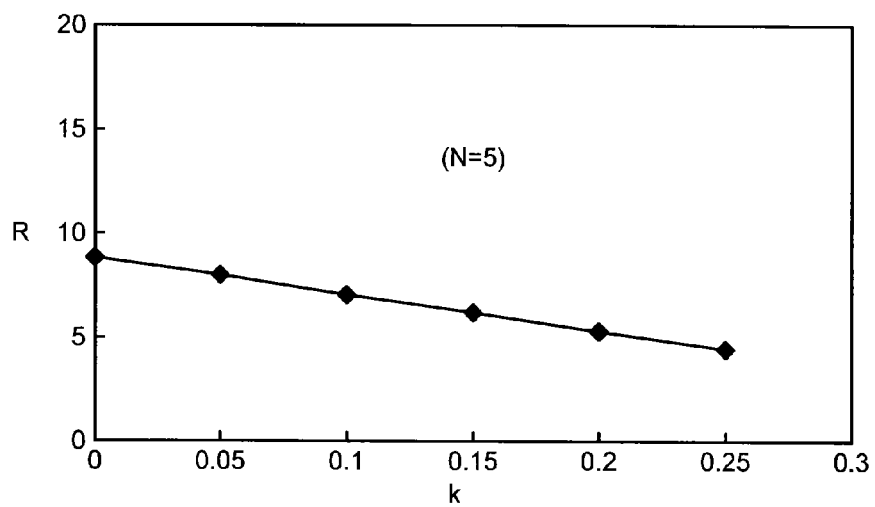
FIG. 19 is a table (1) for illustrating the relationship between the rejection ratio k and the size of the rotational polygon mirror when N=5.
FIG. 20 is a graph (2) for illustrating the relationship between the rejection ratio k and the size of the rotational polygon mirror when N=5.
Figures 21, 22:
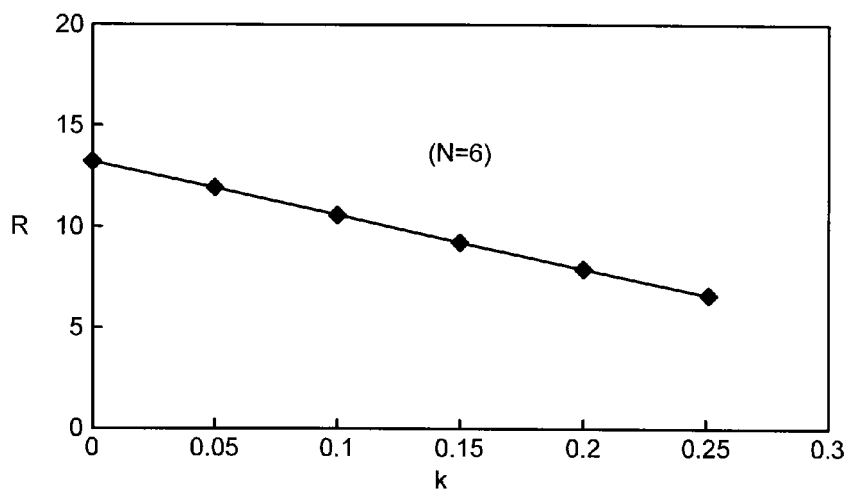
FIG. 21 is a table (1) for illustrating the relationship between the rejection ratio k and the size of the rotational polygon mirror when N=6.
FIG. 22 is a graph (2) for illustrating the relationship between the rejection ratio k and the size of the rotational polygon mirror when N=6.
Figures 23, 24:
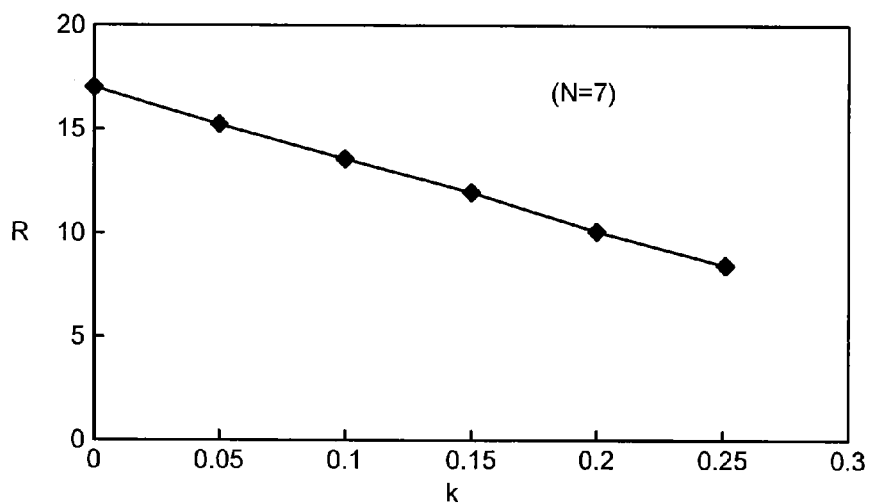
FIG. 23 is a table (1) for illustrating the relationship between the rejection ratio k and the size of the rotational polygon mirror when N=7.
FIG. 24 is a graph (2) for illustrating the relationship between the rejection ratio k and the size of the rotational polygon mirror when N=7.
Figures 25, 26:
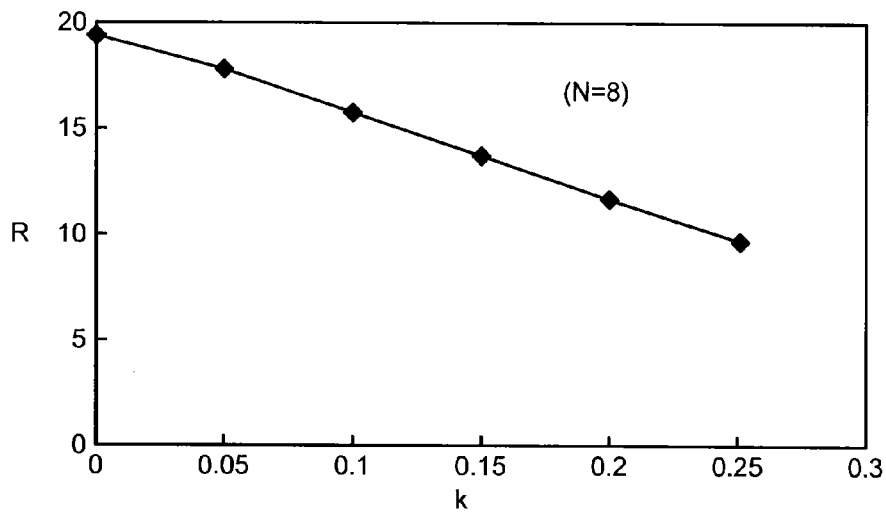
FIG. 25 is a graph (1) for illustrating the relationship between the rejection ratio k and the size of the rotational polygon mirror when N=8.
FIG. 26 is a graph (2) for illustrating the relationship between the rejection ratio k and the size of the rotational polygon mirror when N=8.

FIGS. 17 to 26 illustrate the relationship between the rejection ratio k given by the above expression (13) and the size of the rotational polygon mirror when N takes various numbers. Note that symbol A in FIGS. 17, 19, 21, 23, and 25 expresses the radius of the inscribing circle of the rotational polygon mirror. FIGS. 17 and 18 illustrate a case in which N=4, FIGS. 19 and 20 illustrate a case in which N=5, and FIGS. 21 and 22 illustrate a case in which N=6. In addition, FIGS. 23 and 24 illustrate a case in which N=7, and FIGS. 25 and 26 illustrate a case in which N=8.

Meanwhile, in order to set a beam diameter in the main-scanning direction at 60 to 100 μm on the photosensitive drum, the scanning light flux is required to have a width of 3 to 4 mm in the main-scanning corresponding direction.

It is preferable to maintain the rejection ratio k at less than or equal to 0.2. In view of this, by setting the radius of the circumscribing circle of the rotational polygon mirror to satisfy the following expression (14), it is possible to easily appropriately perform the correction of the light amount.

$$R > \frac{0.6 \times d_{in} \times \sqrt{1 + \tan^2\theta_{in}}}{|\sin\theta_1 - \tan\theta_{in} \times \cos\theta_1 - \sin\theta_2 + \tan\theta_{in} \times \cos\theta_2|} \quad (14)$$

In the embodiment, any of models 12 to 15 in FIG. 21 is employed.

In a conventional UF-type image forming apparatus capable of handling A3 recording sheets, R is nearly equal to 20 mm and the number of rotations is less than or equal to 35000 to 40000 rpm when a rotational polygon mirror having six mirror surfaces (N=6) is used.

As illustrated in FIGS. 21 and 22, the embodiment may use the rotational polygon mirror in which R is nearly equal to 10 mm when the rejection ratio k is equal to 0.1 and the rotational polygon mirror in which R is nearly equal to 8 mm when the rejection ratio k is equal to 0.2. As described above, since the radiuses of the circumscribing circles of the rotational polygon mirrors of the embodiment may be less than or equal to one-half a conventional type, it is possible to increase the number of the rotations up to 60000 to 70000 rpm.

In addition, assuming that a conventional image forming apparatus is required to perform a writing operation with four beams for one photosensitive drum to form, for example, an image having a pixel density of 1200 dpi in a sub-scanning direction, the number of the rotations of the rotational polygon mirror of the embodiment may be double as many as the conventional type and thus only two beams are required to perform a writing operation for one photosensitive drum. Therefore, in the embodiment, the number of the light sources may be reduced by half compared with the conventional image forming apparatus.

Note that it is also possible to reduce the number of the light sources by half according to a light-flux separating method disclosed in Japanese Laid-open Patent Publication No. 2005-92129. However, since the switching control of the photosensitive drum as a writing object becomes complicated besides the requirement of an optical element to evenly separate the light flux, the light-flux separating method causes an increase in cost compared with the embodiment.

Meanwhile, the light flux "rejected" by the rotational polygon mirror turns into unnecessary ghost light. In the embodiment, since the "rejected" light flux returns to the light source at the timing at which the scanning light flux is directed to the scanning end position, there is a likelihood that the oscillating state of the light source becomes unstable. In view of this, it is preferable to set the incident angle $\theta_{in}$ of the incident light flux to prevent the ghost light from returning to the light source. Here, the incident angle $\theta_{in}$ is set to satisfy the following expression (15).

$$|\theta_{in}| + |\theta_e| < 720/N \quad (15)$$

For example, it is preferable to set the incident angle $\theta_{in}$ such that $|\theta_{in}| + |\theta_e|$ is less than 120° when the number of the mirror surfaces is six (N=6), $|\theta_{in}| + |\theta_e|$ is less than 102.8° when the number of the mirror surfaces is seven (N=7), and $|\theta_{in}| + |\theta_e|$ is less than 90° when the number of the mirror surfaces is eight (N=8). Note that the condition of the above expression (15) is satisfied in FIGS. 17, 19, 21, 23, and 25.

In the optical scanning apparatus 2010 of the embodiment, the rotational polygon mirror may be further reduced in size than the conventional UF-type optical scanning apparatus. Therefore, it becomes possible for the optical scanning apparatus 2010 to rotate the rotational polygon mirror at high speed without increasing its consumption power. Further, the optical scanning apparatus 2010 may achieve high-speed image formation and high-density pixels without increasing the number of the light sources, i.e., without causing an increase in cost.

In addition, the optical scanning apparatus 2010 may have a wider scanning angle of view than the conventional OF-type optical scanning apparatus. Therefore, the optical scanning apparatus 2010 may achieve high-speed image formation and high-density pixels without increasing its size.

Meanwhile, a beam-diameter detector is arranged at a position optically equivalent to the scanning region when the optical scanning apparatus 2010 is assembled, and the incident position of the light flux incident on the rotational polygon mirror is adjusted such that the beam diameter becomes equal at both ends of the scanning region. Note that it may also be possible to arrange a light-amount detector such as an optical power meter at a position optically equivalent to the scanning region and adjust the incident position of the light flux incident on the rotational polygon mirror such that the light intensity at both ends of the scanning region becomes equal.

As described above, the optical scanning apparatus 2010 according to the embodiment has the two light sources 2200A and 2200B, the optical system at the front of the deflector, the optical deflector 2104, the scanning optical system, and the like.

The optical deflector 2104 has the rotational polygon mirror in which the width $d_{in}$ of the incident light flux in the main-scanning corresponding direction is smaller than that of each of the mirror surfaces (reflecting surfaces) in the main-scanning corresponding direction and the radius R of the circumscribing circle satisfies the above expression (12).

At this time, the incident light flux is entirely reflected by a reflecting surface at the timing at which the scanning light flux is directed to the central portion of the scanning region, and is partially "rejected" at least one of the timing at which the scanning light flux is directed to the scanning start position in the scanning region and the timing at which the scanning light flux is directed to the scanning end position in the scanning region.

In this case, a reduction in the size of the rotational polygon mirror and the widening of the scanning angle of view may be achieved. Therefore, optical scanning may be performed on the scanning surface at high speed and high accuracy without increasing a size and a cost.

In addition, in the embodiment, the radius R of the circumscribing circle of the rotational polygon mirror satisfies the above expression (14). In this case, it is possible to easily appropriately perform the correction of the light amount.

Moreover, in the embodiment, the incident angle $\theta_{in}$ is set to satisfy the following expression (15). In this case, the light flux "rejected" by the rotational polygon mirror may be prevented from returning to the light sources. Therefore, no countermeasures against returning light are required additionally.

Moreover, the optical system at the front of the deflector includes the four aperture plates 2202a, 2202b, 2202c, and 2202d each having the aperture used to shape the light fluxes emitted from the light sources. The aperture of each of the aperture plates has a shape in which the aperture width in the sub-scanning corresponding direction is smaller at the both-end portions thereof than at the central portion thereof in the main-scanning corresponding direction. In this case, a reduction in the light amount at the both-end portions may be suppressed relative to the central portion in the scanning region.

Further, with the optical scanning apparatus 2010, the multifunction peripheral 2000 may form an image at high quality and high speed without increasing its size and cost.

Note that the above embodiment describes the case in which $d_{in}$ is 4 mm. However, without being limited to this, the optical deflector 2104 may only be required to include the rotational polygon mirror in which $d_{in}$ is smaller in size than the width of each of the mirror surfaces (reflecting surfaces) in the main-scanning corresponding direction and the radius R of the circumscribing circle satisfies the above expression (12). As an example, FIGS. 27 to 29 illustrate a case in which $d_{in}$ is 3.5 mm.

Figure 27:
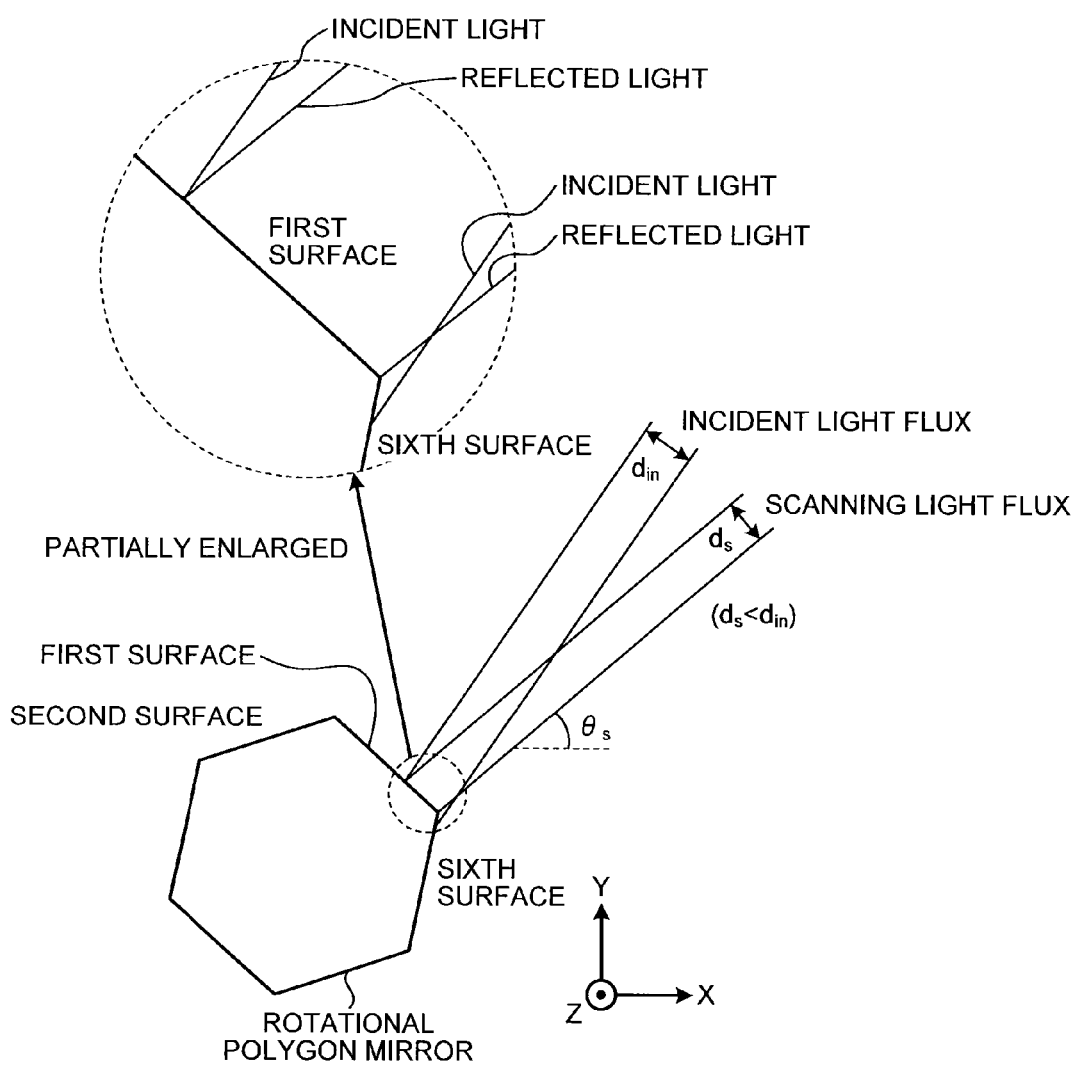
FIG. 27 is a view (1) for illustrating a first modified example.

FIG. 27 illustrates the incident light flux and the scanning light flux with respect to the rotational polygon mirror at the timing at which the scanning light flux is directed to the scanning start position in the scanning region. At this time, $d_s$ is 3.2 mm, and the relationship $d_s < d_{in}$ is established. Further, the angle $\theta_s$ formed between the traveling direction of the scanning light flux and the X axis direction is set at 40°.

Figure 28:
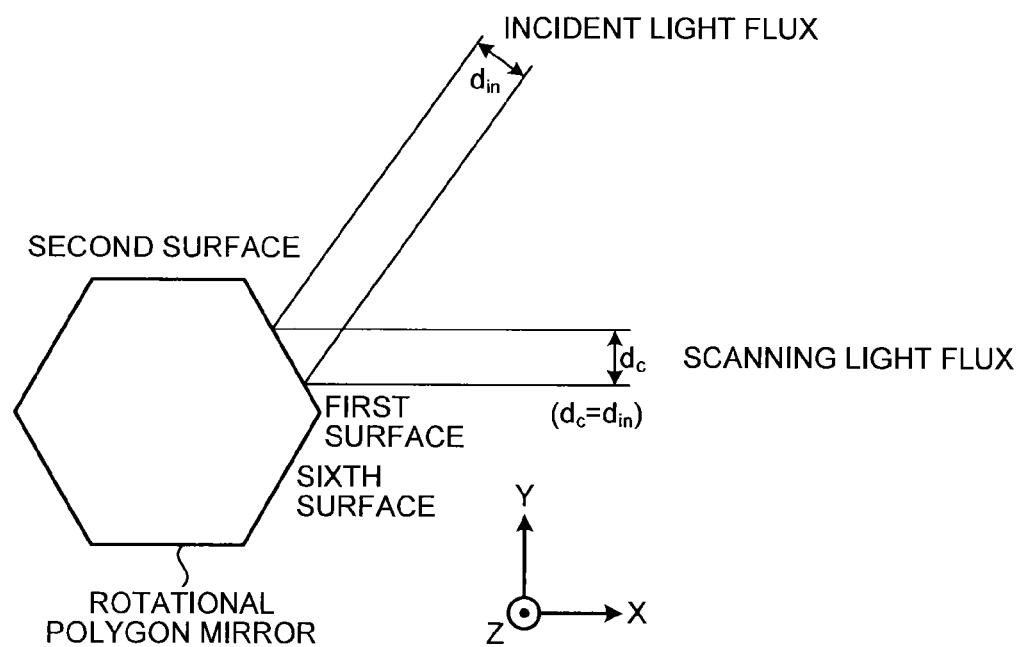
FIG. 28 is a view (2) for illustrating the first modified example.

FIG. 28 illustrates the incident light flux and the scanning light flux with respect to the rotational polygon mirror at the timing at which the scanning light flux is directed to the central position in the scanning region. At this time, $d_c$ is 3.5 mm, and the relationship $d_c = d_{in}$ is established.

Figure 29:
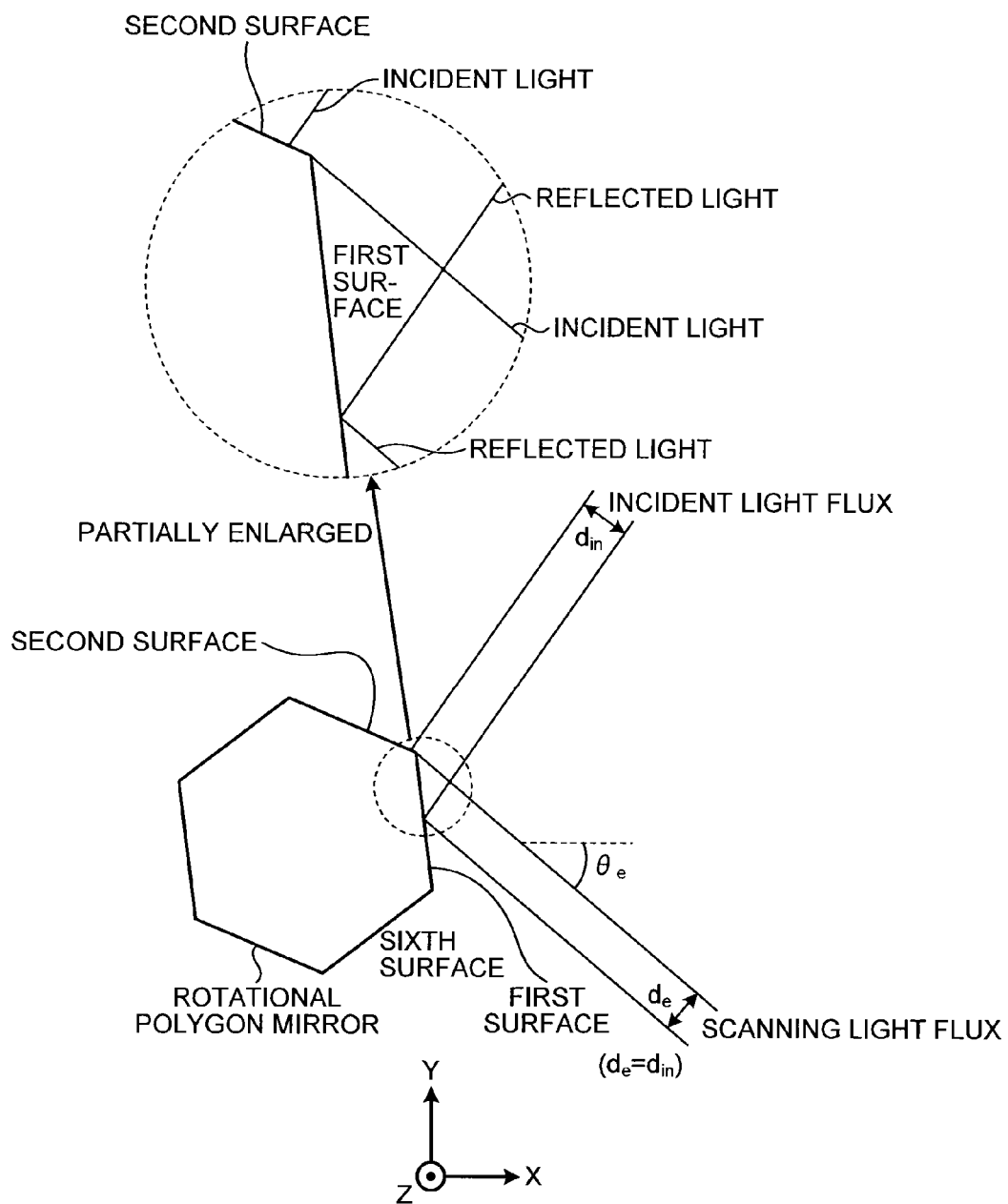
FIG. 29 is a view (3) for illustrating the first modified example.

FIG. 29 illustrates the incident light flux and the scanning light flux with respect to the rotational polygon mirror at the timing at which the scanning light flux is directed to the scanning end position in the scanning region. At this time, $d_e$ is 3.5 mm, and the relationship $d_e = d_{in}$ is established. Further, the angle $\theta_e$ formed between the traveling direction of the scanning light flux and the X axis direction is set at −40°.

In this case, the incident light flux is "rejected" by the optical deflector 2104 at the timing at which the scanning light flux is directed to the scanning start position in the scanning region, but is not "rejected" by the optical deflector 2104 at the timing at which the scanning light flux is directed to the scanning end position in the scanning region. The scanning angle of view at this time is set at 80°.

Figure 30:
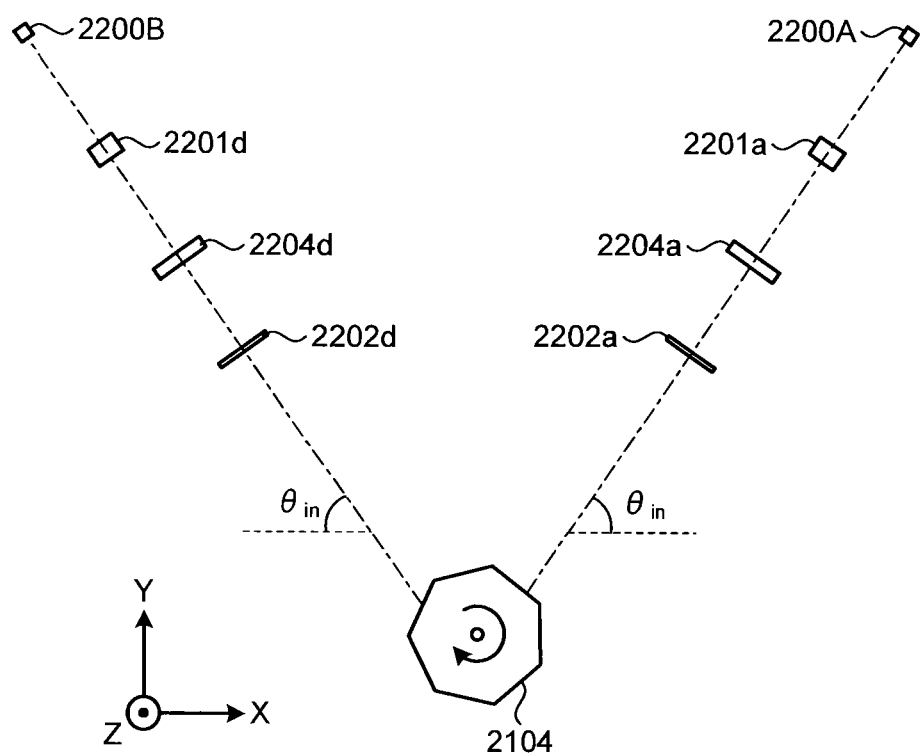
FIG. 30 is a view (1) for illustrating a second modified example.

In addition, the above embodiment describes the case in which N=6. However, without being limited to this, the optical deflector 2104 may only be required to include the rotational polygon mirror in which $d_{in}$ is smaller in size than the width of each of the mirror surfaces (reflecting surfaces) in the main-scanning corresponding direction and the radius R of the circumscribing circle satisfies the above expression (12). As an example, FIG. 30 illustrates a case in which N=7.

Figure 31:
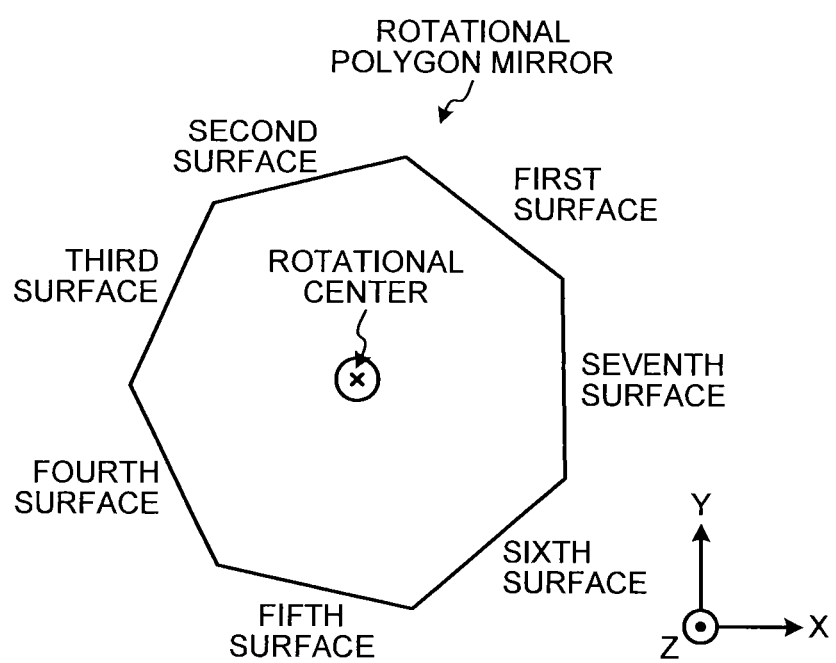
FIG. 31 is a view (2) for illustrating the second modified example.

Here, the angle $\theta_{in}$ formed between the traveling direction of the incident light flux and the X axis direction is set at 60°. In addition, seven deflecting and reflecting surfaces are respectively expressed as first to seventh surfaces counterclockwise when they are required to be distinguished from each another (see FIG. 31). Further, as an example, FIGS. 32 to 34 illustrate a case in which $d_{in}$ is 3.5 mm.

Figure 32:
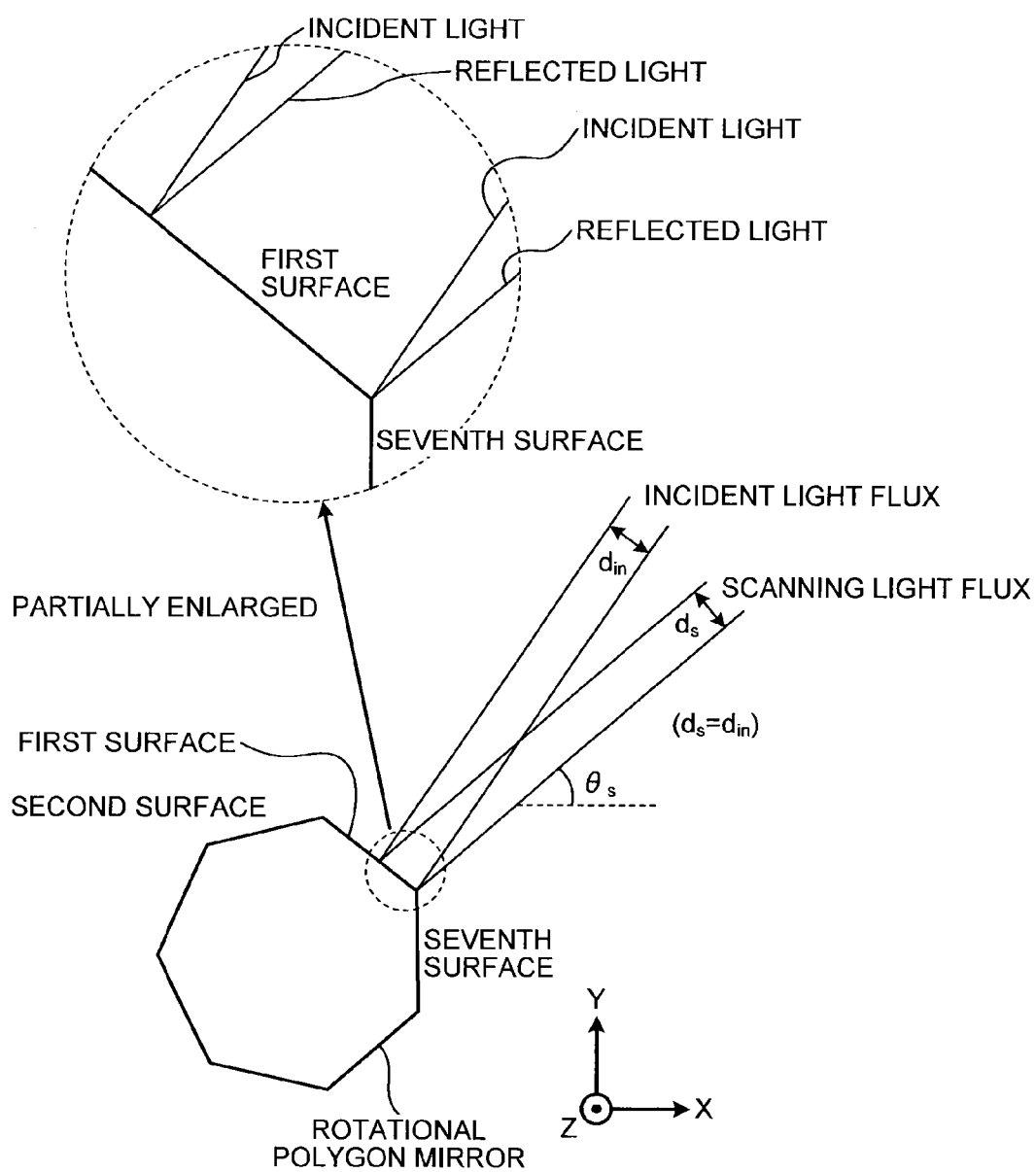
FIG. 32 is a view (3) for illustrating the second modified example.

FIG. 32 illustrates the incident light flux and the scanning light flux with respect to the rotational polygon mirror at the timing at which the scanning light flux is directed to the scanning start position in the scanning region. At this time, $d_s$ is 3.5 mm, and the relationship $d_s = d_{in}$ is established. Further, the angle $\theta_s$ formed between the traveling direction of the scanning light flux and the X axis direction is set at 36°.

Figure 33:
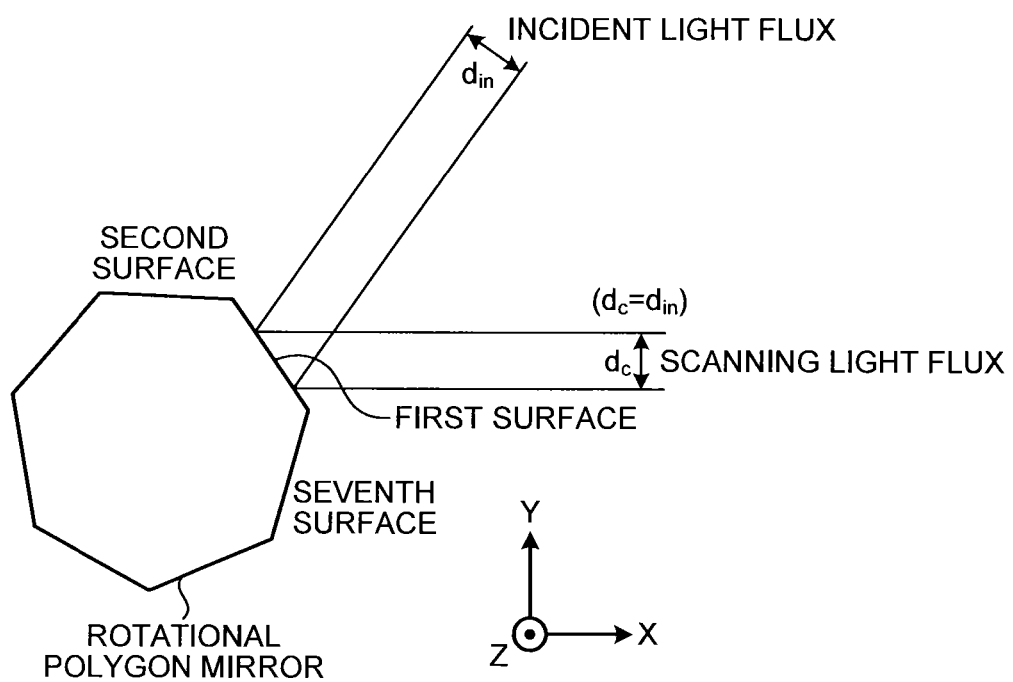
FIG. 33 is a view (4) for illustrating the second modified example.

FIG. 33 illustrates the incident light flux and the scanning light flux with respect to the rotational polygon mirror at the timing at which the scanning light flux is directed to the central position in the scanning region. At this time, $d_c$ is 3.5 mm, and the relationship $d_c = d_{in}$ is established.

Figure 34:
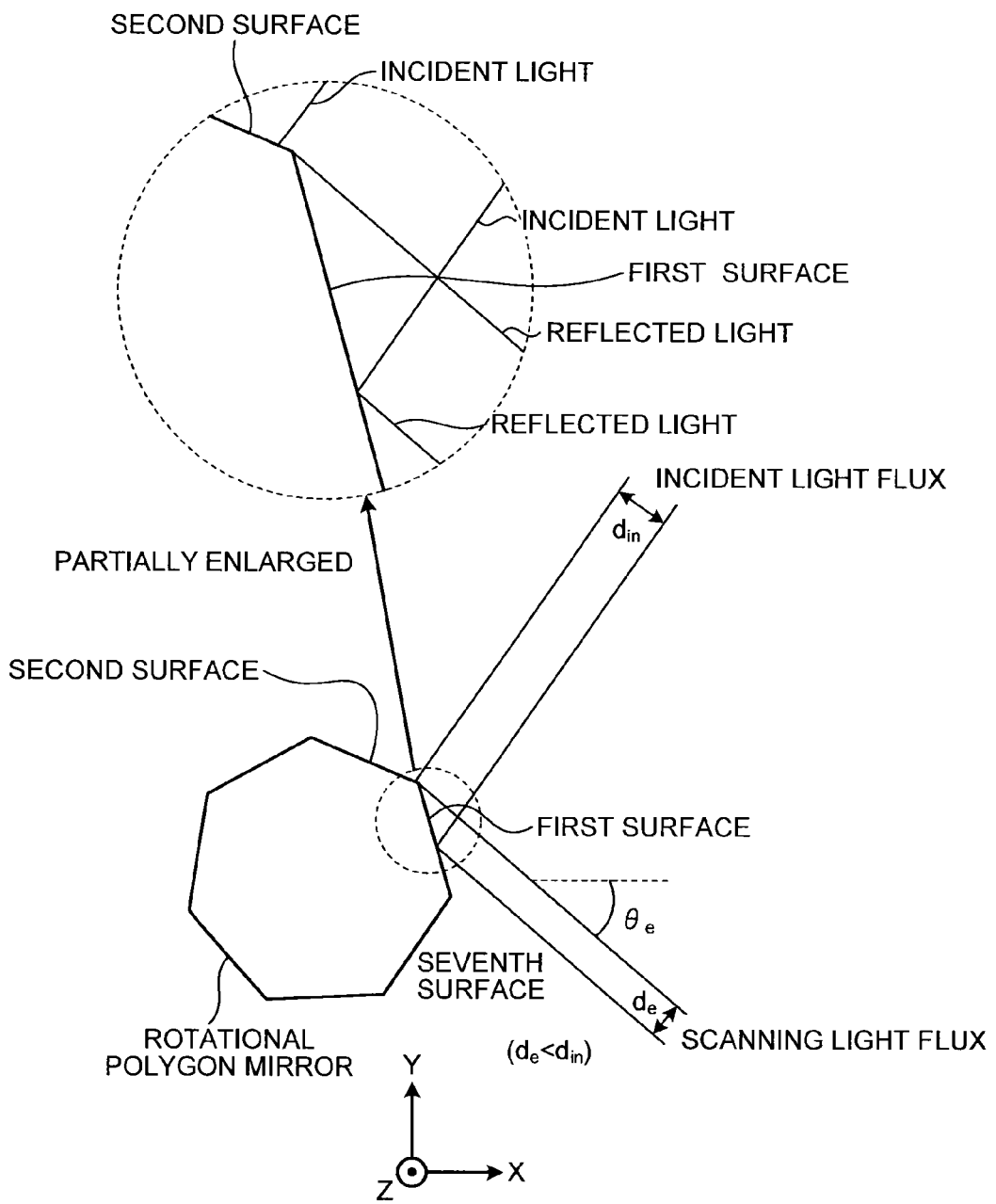
FIG. 34 is a view (5) for illustrating the second modified example.

FIG. 34 illustrates the incident light flux and the scanning light flux with respect to the rotational polygon mirror at the timing at which the scanning light flux is directed to the scanning end position in the scanning region. At this time, $d_e$ is 3.35 mm, and the relationship $d_e < d_{in}$ is established. Further, the angle $\theta_e$ formed between the traveling direction of the scanning light flux and the X axis direction is set at −36°.

In this case, the incident light flux is "rejected" by the optical deflector 2104 at the timing at which the scanning light flux is directed to the scanning end position in the scanning region, but is not "rejected" by the optical deflector 2104 at the timing at which the scanning light flux is directed to the scanning start position in the scanning region. The scanning angle of view at this time is set at 72°.

As described above, when the incident light flux is "rejected" at the timing at which the reflected light flux is directed to the scanning start position or at the timing at which the reflected light flux is directed to the scanning end position, the width $d_b$ is $(1-k)d_{in}$. Therefore, when $(1-k)d_{in}$ is substituted into d in the above expression (11), the following expression (16) is given.

$$R = \frac{(1-k)d_{in} \times \sqrt{1+\tan^2\theta_{in}}}{|\sin\theta_1 - \tan\theta_{in} \times \cos\theta_1 - \sin\theta_2 + \tan\theta_{in} \times \cos\theta_2|} \quad (16)$$

Further, in order to maintain the rejection ratio at less than or equal to 0.2, the radius R of the circumscribing circle of the rotational polygon mirror may only be required to be set to satisfy the following expression (17).

$$R > \frac{0.8 \times d_{in} \times \sqrt{1+\tan^2\theta_{in}}}{|\sin\theta_1 - \tan\theta_{in} \times \cos\theta_1 - \sin\theta_2 + \tan\theta_{in} \times \cos\theta_2|} \quad (17)$$

Second Embodiment

When the light beam reflected by the deflecting and reflecting surface is "rejected", the cross sectional area of the light flux of the light beam deflected to scan by the deflecting and reflecting surface fluctuates with time.

When the "cross sectional area of the light flux fluctuates" in a state in which optical scanning is performed on a scanning surface, the light intensity of a light spot formed on the scanning surface and the diameter of the light spot fluctuate.

The embodiment describes the optical scanning apparatus capable of handling fluctuations in the light intensity of the light spot and the diameter of the light spot caused due to the rejection of the light beam at the deflecting and reflecting surface.

Figure 36:
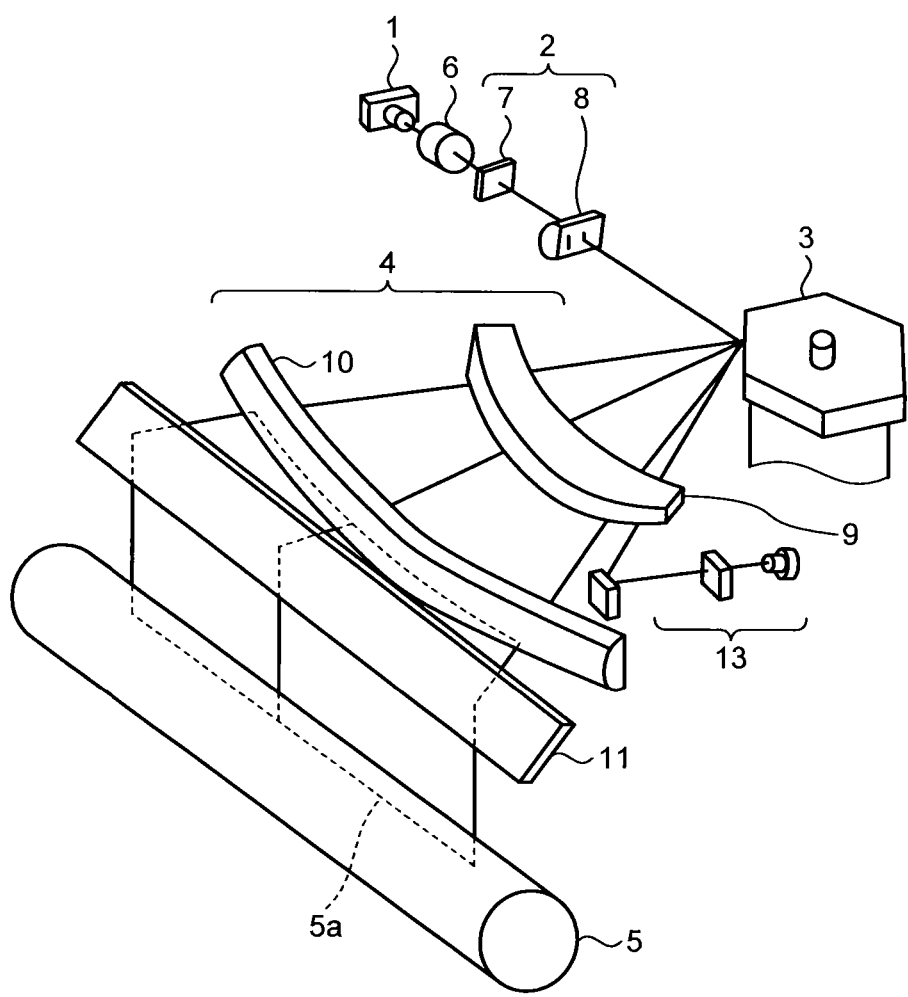
FIG. 36 is a view for illustrating an embodiment of an optical scanning apparatus according to a second embodiment.

FIG. 36 illustrates an embodiment of the optical scanning apparatus.

The optical scanning apparatus performs the "exposure process of an electrophotographic process".

In FIG. 36, symbol 1 indicates a "semiconductor laser serving as a light source".

In addition, an "image forming optical system" indicated by symbol 2 has a coupling lens 6, an aperture element 7, and a cylindrical lens 8 serving as a linear image forming optical system.

Symbol 3 indicates an "optical deflector". The optical deflector 3 is a rotational polygon mirror and will also be called a "polygon mirror" below.

Symbol 4 indicates a "scanning and image forming optical system", symbol 11 indicates a "turning-back mirror", symbol 5 indicates a photosensitive drum having photoconductivity, and symbol 5a indicates the photosensitive surface of the photosensitive drum 5.

In addition, symbol 13 indicates a "synchronization detecting unit".

It is possible to remove the turning-back mirror 11 depending on the layout of the optical system.

An emanative light beam emitted from the semiconductor laser 1 is incident on the image forming optical system 2.

The light beam incident on the image forming optical system 2 is converted by the coupling lens 6 into a "light flux suitable to the following optical system".

The light flux converted by the coupling lens 6 may be a parallel light flux or may be a less emanative or convergent light flux.

The coupling lens 6 is capable of being adjusted in a light axis direction and a main-scanning/sub-scanning direction and converts the converging state of the light flux into a desired light flux by its adjustment.

Note that the main-scanning/sub-scanning direction is a "direction corresponding to the main-scanning/sub-scanning direction of optical scanning on a scanning surface" in any position on a light path ranging from the light source to the scanning surface.

The light beam with the converted light flux passes through the aperture element 7 and is subjected to so-called "beam shaping" in which the periphery of the light flux is light-shielded to have a prescribed "cross-sectional shape of the light flux".

The light beam subjected to the beam shaping is condensed by the cylindrical lens 8 in the sub-scanning direction only and formed as a "linear image elongated in the main-scanning direction" near the deflecting and reflecting surface of the optical deflector 3.

The optical deflector 3 will also be called a "polygon mirror 3" below.

The light beam reflected by the deflecting and reflecting surface of the polygon mirror 3 is deflected to scan at a constant angular speed by the constant speed rotation of the polygon mirror 3.

The deflection scanning of the light beam reflected by the deflecting and reflecting surface is periodically repeated as the deflecting and reflecting surface is switched by the rotation of the polygon mirror 3.

An "angular range at which the light beam is deflected to scan by a first deflecting and reflecting surface" will be called a "deflecting range".

The light beam deflected to scan is guided by the scanning image forming optical system 4 and the turning-back mirror 11 onto the photosensitive surface 5a of the photosensitive drum 5 having photosensitivity to form a light spot on the photosensitive surface 5a.

The direction of the optical scanning by the light spot corresponds to the "main-scanning direction", and a direction orthogonal to the main-scanning direction on the photosensitive surface 5a corresponds to the "sub-scanning direction".

The photosensitive surface 5a constitutes the entity of the "scanning surface" and will also be called a scanning surface 5 below. A region mainly scanned by the light spot on the photosensitive surface 5a will be called an "optical scanning region".

In addition, a region in which an image is written by the optical scanning will be called an "image writing region".

The scanning image forming optical system 4 is composed of an fθ lens 9 and a long toroidal lens 10.

The scanning image forming optical system 4 makes the "linear image elongated in the main-scanning direction" conjugate with the scanning line position of the scanning surface 5a in the sub-scanning direction.

In this manner, the "surface tilt" of the deflecting and reflecting surface of the polygon mirror 3 is corrected.

The fθ lens 9 makes the scanning speed of the light spot on the scanning surface 5a constant.

The synchronization detecting unit 13 detects the light beam deflected to scan by the polygon mirror 3 and deflected to the optical scanning region and generates a synchronization signal for starting the optical scanning.

That is, the synchronization detecting unit 13 has a mirror that reflects the "light beam deflected to the optical scanning region", a sensor that receives the reflected light beam, and a condensing lens.

The condensing lens condenses the light beam onto the sensor.

In the embodiment described herein, some of the characteristics of the invention lies in the "aperture shape" of the aperture element 7 that performs the beam shaping.

That is, the aperture shape of the aperture element 7 is formed such that an aperture width in the sub-scanning direction gradually decreases from the central portion to at least one-side peripheral portion of the aperture in the main-scanning direction.

Typical examples of such an aperture shape are those as illustrated in FIG. 12.

The aperture shape of the aperture element exemplified in (A) of FIG. 12 is an "oval shape in which the long axis direction is set as the main-scanning direction".

The aperture shape of the aperture element exemplified in (B) of FIG. 12 is a "shape (1) in which both peripheral portions in the longitudinal direction of a hole elongated in the main-scanning direction gradually decrease toward peripheral portions in the main-scanning direction".

The aperture shape of the aperture element exemplified in (C) of FIG. 12 is a "diamond shape elongated in the main-scanning direction".

The aperture shape of the aperture element exemplified in (D) of FIG. 12 is a "shape (12) in which both peripheral portions in the longitudinal direction of a hole elongated in the main-scanning direction gradually decrease toward peripheral portions in the main-scanning direction". It is a diamond shape".

Each of the aperture elements has the "aperture shape in which the aperture width in the sub-scanning direction gradually decreases at the peripheral portions in the main-scanning direction", and may be used as the aperture element 7 illustrated in FIG. 36.

In FIG. 36, the "cross section of the light flux" of the light beam incident on the deflecting and reflecting surface of the polygon mirror 3 is smaller in size than the deflecting and reflecting surface.

Accordingly, the light beam may be entirely incident on the deflecting and reflecting surface.

Note that in an example described herein, the light beam incident on the polygon mirror 3 from the side of the light source is formed near the deflecting and reflecting surface as a "linear image elongated in the main-scanning direction".

Figure 37:
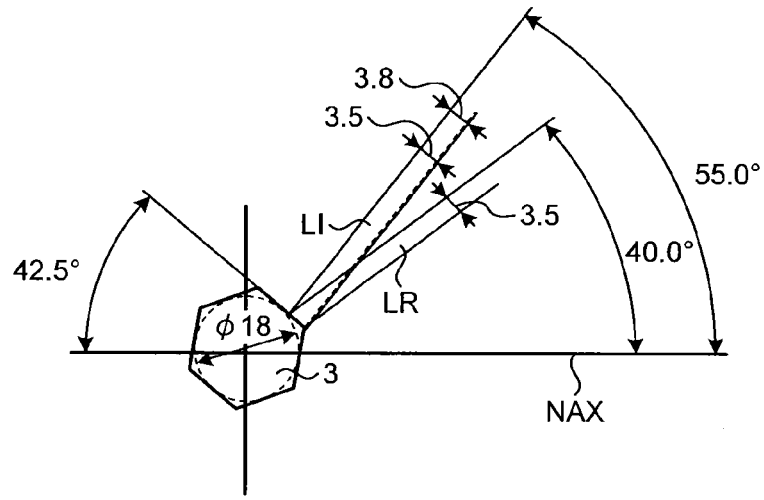
FIG. 37 illustrates the rejection of a light beam by the deflecting and reflecting surface of a rotational polygon mirror.
Figure 37:
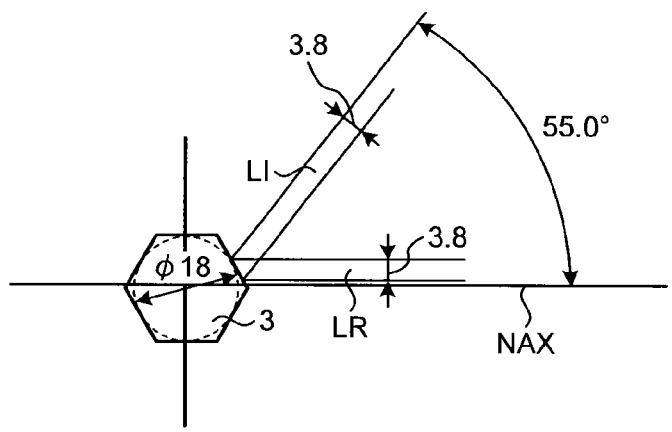
Figure 37:
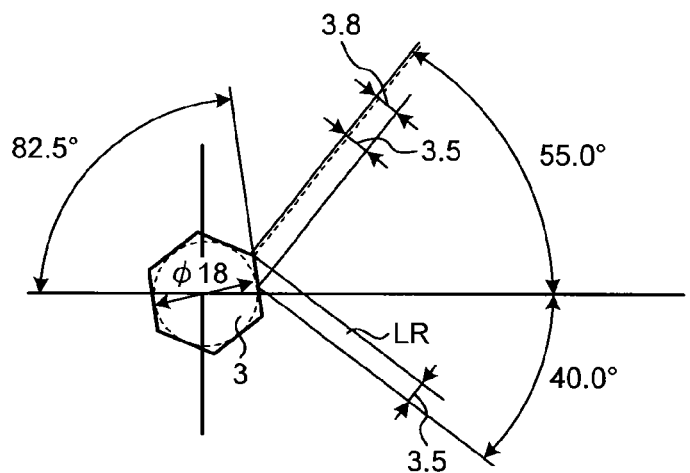

With reference to FIG. 37, a description will be given of an example of the deflection scanning of the light beam deflected by the polygon mirror 3.

FIG. 37 illustrates the state of the deflection scanning when the light beam is projected onto a plane ("main-scanning cross section") orthogonal to the rotational axis of the polygon mirror 3.

In FIG. 37, symbol LI indicates an "incident light beam", and symbol LR indicates a "reflected light beam".

A description will be given in detail based on FIG. 37.

The polygon mirror 3 is configured such that the radius of the inscribing circle of deflecting and reflecting surfaces is 18 mm and the six reflecting and reflecting surfaces are formed at the position 9 mm away from a rotational center.

The incident light beam LI has a light-flux width of 3.8 mm on the main-scanning cross section and is incident on the reflecting and reflecting surface at 55° relative to a reference axis NAX.

The reflected light beam LR is reflected at ±40° relative to the reference axis NAX at a "scanning start position" in (a) of FIG. 37 and a "scanning end position" in (c) of FIG. 37.

At the scanning start position in (a) of FIG. 37 and the scanning end position in (c) of FIG. 37, the incident light beam LI is partially protruded from the deflecting and reflecting surface and is not reflected in a normal direction.

The "normal direction" is a "direction to which the reflected light beam is directed to an optical scanning region". In addition, the deflecting and reflecting surface that causes the light beam to be reflected in the normal direction will be called a "normal deflecting and reflecting surface".

At the scanning start position in (a) of FIG. 37, the "lower portion" of the incident light beam LI in (a) of FIG. 37 is protruded from the normal deflecting and reflecting surface.

The portion of the light beam is reflected by the adjacent deflecting and reflecting surface to the outside of the optical scanning region.

Therefore, the light-flux width of the reflected light beam LR reflected in the normal direction is 3.5 mm (<3.8 mm).

At a scanning central position in (b) of FIG. 37, the incident light beam LI is entirely reflected by the same deflecting and reflecting surface, and the light-flux width of the reflected light beam LR is equal to the light-flux width of the incident light beam LI, 3.8 mm.

At the scanning end position in (c) of FIG. 37, the "upper portion" of the incident light beam LI in (c) of FIG. 37 is protruded from the normal deflecting and reflecting surface and reflected to the outside of the scanning light region by the adjacent deflecting and reflecting surface.

Therefore, the light-flux width of the reflected light beam LR reflected in the normal direction is 3.5 mm (<3.8 mm).

In FIG. 37, the portion of the light flux, which is protruded by the normal deflecting and reflecting surface, of the incident light beam L1 will be called the "portion of the light flux rejected" by the normal deflecting and reflecting surface.

The "rejection of the incident light beam by the normal deflecting and reflecting surface" is caused at a "peripheral portion in a deflecting range".

In a region other than the "peripheral portion in the deflecting range", the "incident light beam is entirely" reflected in the normal direction by the deflecting and reflecting surface of the polygon mirror 3 to be deflected to scan.

In the "peripheral portion in the deflecting range", the light beam LI incident on the polygon mirror 3 is partially "rejected by the deflecting and reflecting surface" and is not reflected in the normal direction (direction to which the scanning light beam is directed to a scanning surface).

A description will be given in detail with reference to FIG. 38.

Figure 38:
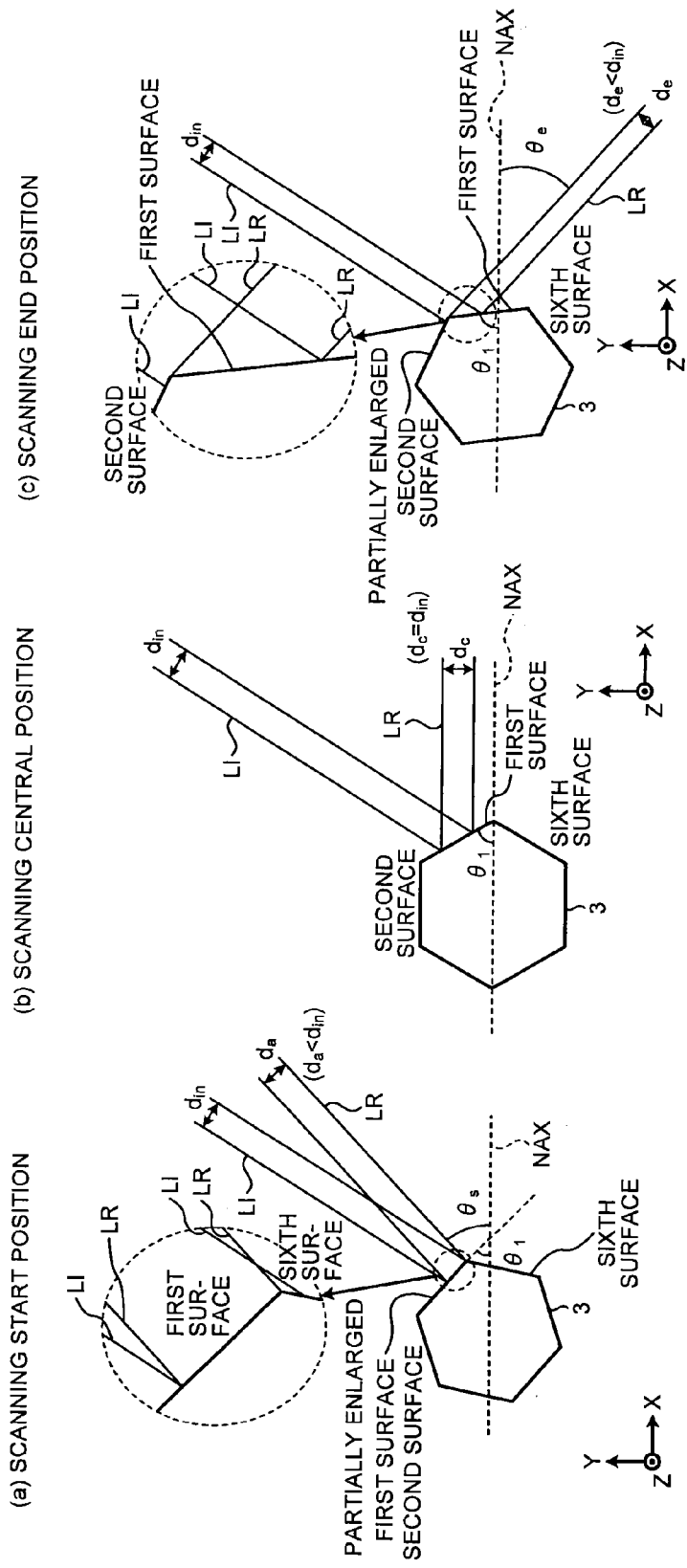
FIG. 38 illustrates the rejection of the light beam by the deflecting and reflecting surface of the rotational polygon mirror.

In FIG. 38, (a) illustrates the relationship between the polygon mirror 3, the incident light beam LI, and the reflected light beam LR at the scanning start position illustrated in (a) of FIG. 37.

In (a) of FIG. 38, the lower portion of the incident light beam LI incident on the normal deflecting and reflecting surface (first surface) with a light-flux width $d_{in}$ is protruded from the normal deflecting and reflecting surface to the adjacent deflecting and reflecting surface (sixth surface).

The portion of the light flux protruded to the deflecting and reflecting surface (sixth surface) is not reflected in the "normal direction".

The reflected light beam LR reflected in the normal direction has a light-flux width $d_a$ smaller than the light-flux width $d_{in}$ ($d_a < d_{in}$).

In FIG. 38, (b) illustrates the relationship between the polygon mirror 3, the incident light beam LI, and the reflected light beam LR at the scanning central position illustrated in (b) of FIG. 37.

The incident light beam LI incident on the normal deflecting and reflecting surface (first surface) with the light-flux width $d_{in}$ is entirely reflected by the normal deflecting and reflecting surface to be turned into the reflected light beam LR.

The reflected light beam LR has a light-flux width $d_c$ equal to the light-flux width $d_{in}$ ($d_c = d_{in}$).

In FIG. 38, (c) illustrates the relationship between the polygon mirror 3, the incident light beam LI, and the reflected light beam LR at the scanning end position illustrated in (c) of FIG. 37.

In (c) of FIG. 38, the upper portion of the incident light beam LI incident on the normal deflecting and reflecting surface (first surface) with the light-flux width $d_{in}$ is protruded from the normal deflecting and reflecting surface to the side of the adjacent deflecting and reflecting surface (second surface).

The portion of the light flux protruded to the deflecting and reflecting surface (second surface) is not reflected in the "normal direction".

The reflected light beam LR reflected in the normal direction has a light-flux width $d_e$ smaller than the light-flux width $d_{in}$ ($d_e < d_{in}$).

The aperture element 7 has the aperture shape "in which the aperture width in the sub-scanning direction gradually decreases at the peripheral portions in the main-scanning direction" as exemplified in FIG. 12.

Accordingly, the light-flux cross section of the light beam subjected to the beam shaping by the aperture element 7 has the same shape as that of the aperture.

Further, the "portion of the light flux rejected by the normal deflecting and reflecting surface" corresponds to the portion of the light flux passing through the "portions in which the aperture width in the sub-scanning direction gradually decreases" at the peripheral portions of the aperture shape in the main-scanning direction.

For example, in the case of (B) of FIG. 12, the aperture shape has a region (region I) in which the aperture width in the sub-scanning direction is constant and regions (regions II) in which the aperture width in the sub-scanning direction gradually decreases.

In this case, the "portion of the light flux rejected by the normal deflecting and reflecting surface" corresponds to the portion of the light flux passing through the regions II at the peripheral portions of the aperture shape in the main-scanning direction.

In addition, in the cases of (A) to (C) of FIG. 12, the "portion of the light flux rejected by the normal deflecting and reflecting surface" corresponds to the portion of the light flux passing through the "portions in which the aperture width in the sub-scanning direction gradually decreases" at the peripheral portions of the aperture shape in the main-scanning direction.

In the embodiment described herein, the optical system for the optical scanning is based on so-called an "under field optical system" in which the deflecting and reflecting surface is greater in size than the light-flux cross section of the incident light beam.

Therefore, a deflecting angle of view for deflection scanning may be set just like a conventional under field optical system, and an "increase in the size of an apparatus" caused in so-called an over field optical system may be avoided.

Further, in the optical scanning apparatus described herein, the "high speed and high density" of the optical scanning is supported with a reduction in size of the polygon mirror 3.

When a "six-surface polygon mirror" is employed in a general under field optical system, the radius of its inscribing circle is about 16 to 18 mm.

In the example described herein, the radius of the inscribing circle of the polygon mirror 3 is 9 mm as described above, and thus the polygon mirror 3 is reduced in size.

The polygon mirror 3 reduces a windage loss with the reduction in its size. In addition, when the polygon mirror 3 reduces its weight, the diameter of a bearing may be reduced and thus the frictional force is reduced. Therefore, it becomes possible to perform a high-speed rotation.

Generally, when "the number of deflecting and reflecting surfaces is made constant and the radius of an inscribing circle is reduced", the deflecting and reflecting surfaces become small and a deflectable angle becomes narrow. Therefore, in order to obtain a desired writing width, an optical scanning apparatus is likely to be increased in size.

In the embodiment described herein, the "incident light beam LI is not partially reflected to the scanning surface 5a only at the peripheries in the deflecting range".

In the embodiment, the "region of the scanning surface 5a in which an image is written by the optical scanning (image writing region)" is the same as that of a conventional under field optical system.

The reflected light beam rejected by the normal deflecting and reflecting surface near ends in the deflecting range is used as a "light beam for synchronization detection".

The reflected light beam incident on the synchronization detecting unit 13 fluctuates such that the "area of the light flux rejected by the deflecting and reflecting surface increases" with the rotation of the deflecting and reflecting surface.

Therefore, the reflected light beam that scans the synchronization detecting unit 13 reduces its light amount and "increases the diameter of its light spot in the main-scanning direction".

The light-flux cross section of the incident light beam is close to a "linear image elongated in the main-scanning direction" near the deflecting and reflecting surface and subjected to the beam shaping by the aperture element 7.

Accordingly, the incident light beam gradually decreases its light amount toward the peripheral portions in the main-scanning direction.

Accordingly, when the "rejection amount" of the incident light beam fluctuates, the incident light beam does not rapidly "reduce its light amount" and "increase the diameter of its light spot" but moderately fluctuates them.

Since the "light amount moderately fluctuates" as described above, the "fluctuation in the light amount" may be corrected in such a manner that the light amount of the emitting light of the semiconductor laser 1 serving as the light source is "increased with the fluctuation in the light amount".

Alternatively, the correction may be made by the adjustment of the sensitivity of the sensor (photo diode) of the synchronization detecting unit 13.

The impact of the "increase in the diameter of the light spot" is smaller compared with the image writing region.

The increase in the diameter of the light spot results in a reduction in the light receiving amount of the sensor of the synchronization detecting unit, but may be handled by the adjustment of the light amount of the emitting light and the sensitivity of the sensor since the diameter of the light spot moderately fluctuates.

When a conventional aperture element having a "rectangular aperture shape" is used, "the cross-sectional area of the light flux greatly fluctuates due to the rejection". Therefore, the light amount rapidly reduces, and the diameter of the light spot rapidly increases.

Therefore, it is difficult to deal with the reduction in the light amount and the increase in the diameter of the light spot with the increase in the light amount of the light of the light source and the adjustment of the sensitivity of the sensor.

Since a range in which the incident light beam is rejected by the normal deflecting and reflecting surface of the polygon mirror 3 is physically determined, it is possible to reduce the "fluctuations in the light amount and the diameter of the light spot" within the range in the manner described above.

In the embodiment described above, the incident light beam rejected by the normal deflecting and reflecting surface is reflected to the synchronization detecting unit.

As described above, according to the invention, since the aperture element is formed to have the aperture shape as described above, the "degradation of the diameter of the light spot and the fluctuation in the light amount" may be maintained at a low level.

Accordingly, by setting the "deflecting range from the peripheral portions of the image writing region to the synchronization detecting unit" as the range in which the incident light beam is rejected, it is also possible to further reduce the size of the polygon mirror.

The above setting gives a less impact on an image since the fluctuation in the light amount and the degradation of the diameter of the light spot do not occur rapidly but occur moderately with the "aperture shape of the aperture element" according to the invention.

In the over field optical system, the fluctuations in the diameter of the light spot and the light amount occur in the entire image writing region.

According to the invention, it is advantageous that the fluctuations are made outside the image writing region or only at the ends of the image writing region and that the aperture shape makes the fluctuation amounts small.

Consideration is given to a case in which a "region optically scanned by the reflected light beam partially rejected by the deflecting and reflecting surface" is set close to the central side (for example, 20 mm away from the end) of the image writing region.

At this time, a "region in which the light amount reduces" is also included at the periphery of the optical scanning region.

Since the fluctuation in the light amount is moderate, it is also possible to correct the reduction in the light amount with an increase in the output (emitting amount of the light) of the light source.

As described above, by arbitrarily setting the size of the polygon mirror 3 and achieving the number of the rotations of the polygon mirror, it is possible to support the high speed and high density of the optical scanning.

At this time, it is also assumed that the "light amount required for the synchronization detection" is not obtained.

In the above description, the incident light beam is partially rejected on both the scanning start side and the scanning end side.

Other than the above, it is also possible to make the setting such that the incident light beam is not "rejected" on the arrangement side of the synchronization detecting unit 13 (for example, on the scanning start side) and is rejected on, for example, the scanning end side only.

At this time, it is greatly advantageous in that the "fluctuations in the diameter of the light spot and the light amount due to the rejection of the incident light beam are small".

When the incident light beam is rejected "on the scanning end side only" as described above, the aperture shape may be formed such that the "width in the sub-scanning direction gradually decreases only one side in the main-scanning direction".

The aperture elements exemplified in FIG. 12 realize the respective aperture shapes of a single structure but are not limited to them. That is, the aperture shapes may be constituted of two aperture elements.

According to the embodiments, the incident light beam is partially rejected by the deflecting and reflecting surface.

When the light beam is rejected, the "fluctuations in the diameter of the light spot and the light amount" are moderate due to the aperture shape of the aperture element.

However, if there is a fluctuation in the incident position of the incident light beam incident on the deflecting and reflecting surface, the "fluctuations in the diameter of the light spot and the light amount" do not occur as designed.

The incident position of the light beam incident on the deflecting and reflecting surface fluctuates with a fluctuation in the positions of the light source and the "coupling lens that brings the light beam into a desired light-flux state and determines an emitting direction".

The incident position is also impacted by the tilt of a "light source unit that holds the light source and the coupling lens" or the like.

Generally, since the light source is arranged near the wall surface of an optical box that holds a light source board and an optical element, it is away from the optical deflector.

Therefore, with a fluctuation in the direction of the light beam emitted from the light source, the incident position at the deflecting and reflecting surface greatly fluctuates and the amount of the incident light beam rejected by the deflecting and reflecting surface fluctuates.

The fluctuation in the "incident position of the light beam incident on the deflecting and reflecting surface" may be reduced in such a manner that the aperture element is arranged close to the deflecting and reflecting surface.

However, the linear image forming optical element, which forms the incident light flux "into an image near the reflecting surface of the polygon mirror in the sub-scanning direction", is arranged between the light source and the polygon mirror.

Generally, a cylindrical lens is used as the linear image forming optical element.

In the sub-scanning direction, the light-flux width of the light beam passing through the cylindrical lens rapidly reduces as it moves closer to the deflecting and reflecting surface.

When the single aperture element is used, it is preferably arranged near the deflecting and reflecting surface as much as possible.

However, when the single aperture element is arranged between the cylindrical lens and the deflecting and reflecting surface, the impact of the installation error of the aperture element and the cylindrical lens becomes a problem particularly in a light axis direction.

Figure 39:
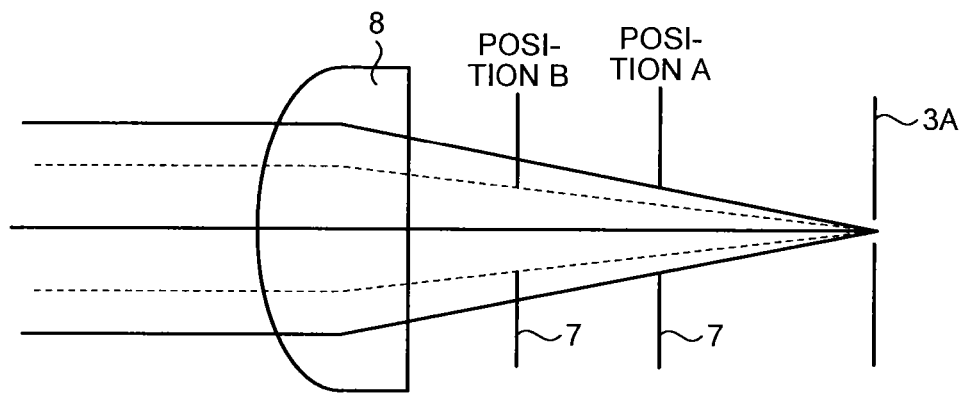
FIG. 39 illustrates the use of first and second aperture elements.
Figure 39:
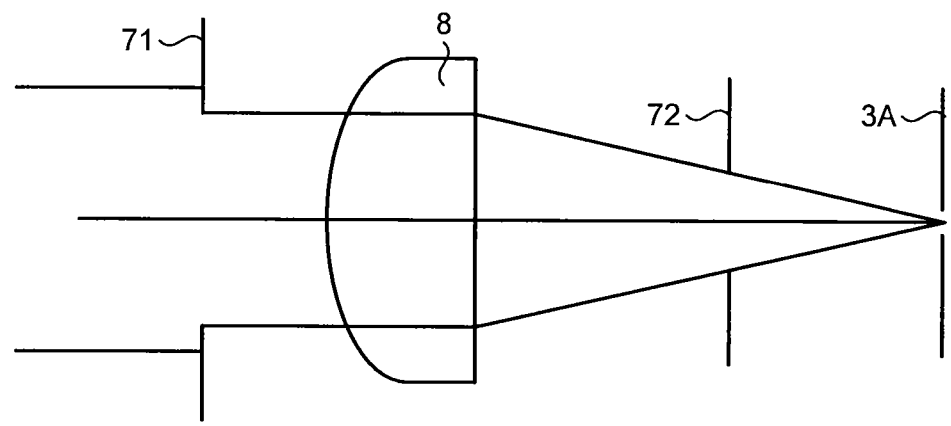
Figure 39:
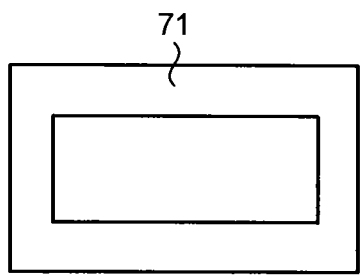
Figure 39:
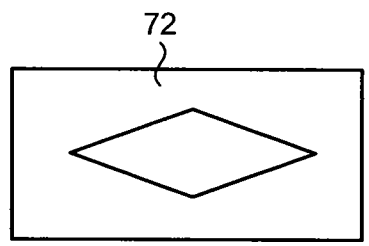

In FIG. 39, (a) illustrates such a state. In (a) of FIG. 39, positions A and B exemplify the "two positions of the same aperture element 7". A vertical direction in (a) of FIG. 39 corresponds to the sub-scanning direction.

If an actual installation position is erroneously set at the "position B" when the aperture element 7 is set at the "appropriate installation position A", the amount of the passing light decreases from an amount indicated by solid lines to an amount indicated by dashed lines.

In addition, if the NA (Numerical Aperture) of the light beam incident on the deflecting and reflecting surface fluctuates, the diameter of the light spot also fluctuates for the "same reason as the fact that the diameter of the light spot fluctuates with a fluctuation in an aperture width".

This results in an increase in the fluctuations in the light amount and the diameter of the light spot and a reduction in image quality.

In order to avoid this, it is preferable to arrange a first aperture element closer to the side of the light source than the cylindrical lens serving as the linear image forming optical element and arrange a second aperture element between the cylindrical lens and the optical deflector.

In FIG. 39, (b) illustrates a state in which a first aperture element 71 is provided on the side of the light source of the cylindrical lens and a second aperture element 72 is provided on the side of a deflecting and reflecting surface 3A of the cylindrical lens 8.

The first aperture element 71 restricts the "width of the light beam in the sub-scanning direction".

In addition, the second aperture element 72 restricts the width of the light beam in the main-scanning direction and a fluctuation in the aperture width in the sub-scanning direction along the main-scanning direction.

In FIG. 39, (c) illustrates the aperture shape of the first aperture element 71.

As illustrated in (c) of FIG. 39, the aperture shape of the first aperture element 71 may be a rectangular shape having an "aperture width in the sub-scanning direction required at the center in the main-scanning direction".

Since the light beam incident on the cylindrical lens 8 is a substantially-parallel light flux, it is free from the impact of the installation error of the aperture element 71 and the cylindrical lens 8 or the like.

It becomes also possible to "adjust the curvature of an image surface in the sub-scanning direction" by moving the cylindrical lens 8 in a light axis direction.

The second aperture element 72 restricts the light-flux width of the light beam passing through the cylindrical lens 8 in the main scanning direction (direction orthogonal to (b) of FIG. 39).

That is, the "aperture width of the aperture element 72 in the main-scanning direction" is smaller than the light-flux width of the light beam in the main-scanning direction.

Between the cylindrical lens 8 and the deflecting and reflecting surface 3A, the beam shape of the light beam in the main-scanning direction is a substantially-parallel light flux just like before the light beam is incident on the cylindrical lens 8.

Therefore, the "position of the second aperture element 72 in the main-scanning direction" may be set without suffering from the "impact of the installation error or the like" between the cylindrical lens 8 and the deflecting and reflecting surface 3A.

In FIG. 39, (d) illustrates an example of the aperture shape of the second aperture element 72. The aperture shape is the same as the aperture shape of the aperture element illustrated in (c) of FIG. 39.

The length of the aperture of the aperture element 72 in the main-scanning direction is smaller in size than the light-flux width of the incident light beam in the main-scanning direction.

Since the two aperture elements 71 and 72 are arranged with the cylindrical lens 8 inserted therebetween, a fluctuation in the incident position of the light beam incident on the deflecting and reflecting surface 3A may be reduced.

Accordingly, the "amount of the incident light beam rejected" by the deflecting and reflecting surface may be settled.

When the first and second aperture elements are used as described above, the "aperture width in the sub-scanning direction" is "gradually decreased by the two aperture elements in a synthetic manner from the central portion to the peripheral portions in the main-scanning direction".

In a case in which the maximum rejection amount of the incident light beam is determined based on the light amount or the like, it becomes possible to minimize the size of the polygon mirror.

This brings about an advantage to the high-speed rotation of the polygon mirror. In addition, the reduction in the fluctuation in the light amount brings about an advantage such as an improvement in the accuracy of the synchronization detection described above.

As described above, the "position of the second aperture element 72 in the main-scanning direction" may be set without suffering from the "impact of the installation error or the like" between the cylindrical lens 8 and the deflecting and reflecting surface 3A.

Further, since the second aperture element 72 is arranged close to the deflecting and reflecting surface 3A, the fluctuation in the incident position of the light beam incident on the deflecting and reflecting surface 3A may be reduced.

However, the incident light beam directed from the cylindrical lens 8 to the deflecting and reflecting surface 3A is converged in the sub-scanning direction.

Therefore, if the aperture element 72 is arranged excessively close to the deflecting and reflecting surface 3A, the light-flux width of the incident light beam in the sub-scanning direction is very small at the position.

In such a situation, it seems to be difficult to form the aperture shape of the aperture element 72 into a "shape in which the aperture in the sub-scanning direction gradually decreases toward the peripheries in the main-scanning direction".

An aperture element used in a general optical scanning apparatus has an aperture width of 1 mm or greater in a sub-scanning direction, and it is of course possible to form an "oval aperture shape elongated in a main-scanning direction".

However, when the incident light beam converging in the sub-scanning direction toward the deflecting and reflecting surface 3A has a width of less than or equal to 0.5 mm in the sub-scanning direction, it becomes difficult to form the aperture shape at a reasonable cost.

The interval between the cylindrical lens and the second aperture element is expressed as L, the focal distance of the cylindrical lens in the sub-scanning direction is expressed as f, and the aperture width of the first aperture element in the sub-scanning direction is expressed as a.

From the viewpoint of the easiness of forming the aperture shape and securing accuracy in the installation position, the interval L, the focal distance f, and the aperture width a preferably satisfy the condition $L < f - 0.5 \cdot f/a$.

"0.5" on the right side of the condition has the dimension of length and is expressed in units of "mm".

The reduction in the fluctuation in the incident position of the light beam incident on the polygon mirror is described above.

In order to secure further accuracy, it is desirable to position the aperture element with respect to the reference axis of the optical deflector at least in the main-scanning direction.

Particularly for the aperture element 72 that sets the light-flux width of the light beam in the main-scanning direction, the "incident position of the light beam incident on the deflecting and reflecting surface in the main-scanning direction" fluctuates with the positional accuracy of the aperture element 72 in the main-scanning direction.

Therefore, it is preferable to "position the aperture element with respect to the reference axis of the optical deflector" at least in the main-scanning direction. The reference axis corresponds to the "axis that positions the optical deflector inside the optical box".

For example, when the rotational axis of the polygon mirror is set as the reference axis and the aperture element is positioned with respect to the rotational axis, the "radius of the inscribing circle of the polygon mirror" is set based on the center of the polygon mirror.

Accordingly, a fluctuation in the radius of the inscribing circle gives an impact on the rejection amount of the light beam.

When the "position of the aperture element in the main-scanning direction" is set based on the rotational axis of the polygon mirror, the cumulation of the fluctuation in the incident position of the light beam incident on the deflecting and reflecting surface in the main-scanning direction may be reduced.

A description will be given of "another method for arranging the aperture element" to reduce the fluctuation in the incident position of the light beam incident on the deflecting and reflecting surface of the polygon mirror in the main-scanning direction.

The aperture element is "fixable at any position in the main-scanning direction with respect to the light beam".

Accordingly, by "shifting the aperture element in the main-scanning direction", it becomes possible to cause the incident light beam to be incident at a desired position on the deflecting and reflecting surface of the polygon mirror.

Specifically, the aperture element is shifted in the main-scanning direction to adjust the position thereof such that the light amount or the diameter of the light spot at both scanning ends has a desired value (the same value if the light beam is symmetrically rejected).

Then, after the position of the aperture element is adjusted, the aperture element is fixed by bonding or the like.

Although there is a limit on reducing the fluctuation in the position of the light beam incident on the deflecting and reflecting surface in the main-scanning direction by mechanical accuracy, it becomes possible to reduce the fluctuation by the adjustment described above.

Hereinafter, with reference to FIG. 40, a description will be given of an embodiment of the image forming apparatus using the optical scanning apparatus of the invention.

Figure 40:
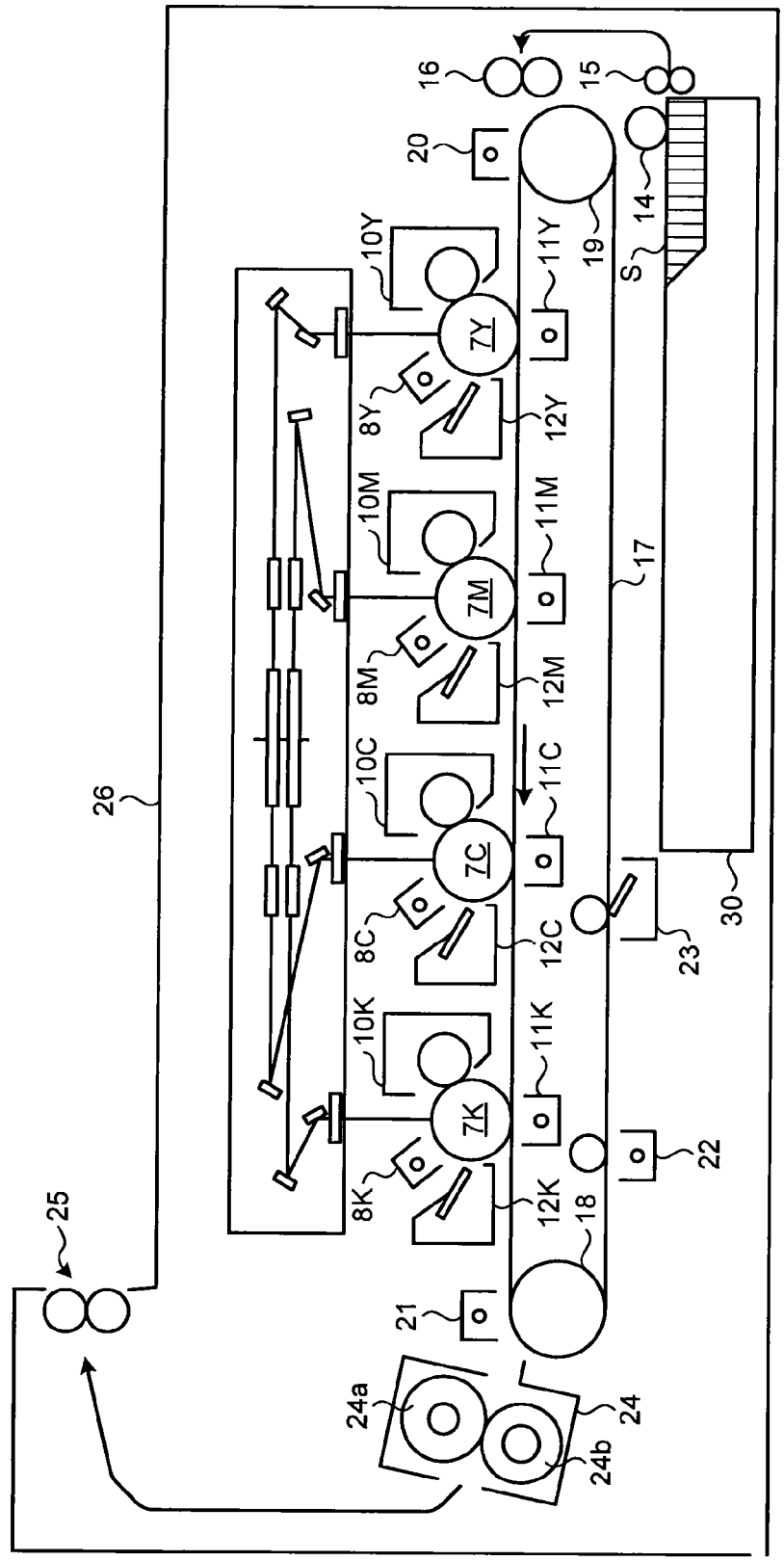
FIG. 40 is a view for illustrating an embodiment of an image forming apparatus.

The image forming apparatus in FIG. 40 is a "tandem full-color laser printer".

In FIG. 40, a conveying belt 17 that conveys transfer sheets (not illustrated) fed from a sheet feeding cassette 30 is horizontally provided on the side of a lower portion inside the apparatus.

On the conveying belt 17, photosensitive bodies 7Y, 7M, 7C, and 7K are evenly provided in this order from an upstream side in the conveying direction of the transfer sheets.

Y, M, C, and K of the symbols 7Y, 7M, 7C, and 7K of the photosensitive bodies express the colors of yellow, magenta, cyan, and black, respectively.

In addition, other members with these symbols Y, M, C, and K are used to form images of the respective colors.

All the photosensitive bodies 7Y, 7M, 7C, and 7K are "formed to have the same diameter" and have processing members in order on the peripheries thereof to perform respective processes according to an electrophotographic process.

For example, in the case of the photosensitive body 7Y, an electrification charger 8Y, a developing device 10Y, a transferring charger 11Y, a cleaning device 12Y, and the like are provided in order.

Over the photosensitive bodies 7Y, 7M, 7C, and 7K, the optical scanning apparatus that performs the exposure process of the electrophotographic process is provided.

The optical scanning apparatus commonly uses a two-stage polygon mirror as an "optical system that writes the images of the respective colors of Y, M, C, and K".

Then, the optical scanning apparatus optically scans each of the photosensitive bodies 7Y, 7M, 7C, and 7K between the electrification charger and the developing device to perform image writing.

One or two aperture elements are provided on each light path ranging from a light source for writing the images of the respective colors to the deflecting and reflecting surface of the polygon mirror in the manner described above.

Each of the deflecting and reflecting surfaces of the two-stage polygon mirror is greater in size than an incident light beam, and the incident light beam is "rejected" at the peripheral portions in a deflecting region.

At the periphery of the conveying belt 17, timing rollers 16 and a belt electrification charger 20 are provided upstream of the photosensitive body 7Y.

In addition, a belt separating charger 21, static eliminating chargers 8, cleaning devices 12, and the like are provided in order downstream of the photosensitive body 7K in the rotational direction of the conveying belt 17.

A fixing device 24 is provided downstream of the belt separating charger 21 in a transfer sheet conveying direction and connected to a discharge tray 26 via sheet ejecting rollers 25.

When a full-color mode (multi-color mode) is, for example, placed under such a configuration, "image signals for Y, M, C, and K images" with respect to the photosensitive bodies 7Y, 7M, 7C, and 7K are input to the optical scanning apparatus.

Then, the optical scanning apparatus optically scans the respective photosensitive bodies 7Y, 7M, 7C, and 7K to form electrostatic latent images corresponding to the respective color signals.

These electrostatic latent images are developed by the corresponding developing devices to be turned into color toner images.

The respective colors of the color toner images are sequentially transferred onto the "transfer sheet electrostatically attracted onto the conveying belt 17 for conveyance" and overlapped with each other to be turned into a full-color image.

The full-color image is fixed by the fixing device 24 and then ejected onto the discharge tray 26 by the sheet ejecting rollers 25.

If the optical scanning apparatus of the invention is used as the optical scanning apparatus of the image forming apparatus described above, the optical deflector may be reduced in size.

In addition, a timing for starting optical scanning may be appropriately adjusted, and image reproducibility may be secured without causing color deviations.

As described above, according to the invention, it is possible to achieve the optical scanning apparatus capable of supporting high speed and high density without increasing the size of the optical scanning apparatus due to an increase in the length of a light path or the like.

Specifically, it becomes possible to reduce the size of the polygon mirror and rotate the same at high speed.

As a result, it becomes possible to achieve high-density writing and high speed at low cost.

In the above description, the polygon mirror is used as the optical deflector to perform the deflection scanning with the light beam, but the optical deflector is not limited to the polygon mirror.

The invention may also be applied to an optical scanning apparatus described in Japanese Laid-open Patent Publication No. 2010-122248 that uses an "oscillating mirror" as a deflecting and reflecting surface to perform deflection scanning with a light beam.

In the optical scanning apparatus of the embodiment, the amount of the light beam shielded by one or more aperture elements in the sub-scanning direction "gradually increases" from the central portion to the peripheral portions in the main-scanning direction.

Accordingly, the amount of the light beam rejected by the deflecting and reflecting surface continuously gradually increases from the sides of the ends of the light-flux cross section in the main-scanning direction.

Accordingly, the fluctuations in the light amount of the light beam and the light spot "due to the rejection" do not occur rapidly but occur moderately.

Figure 35:
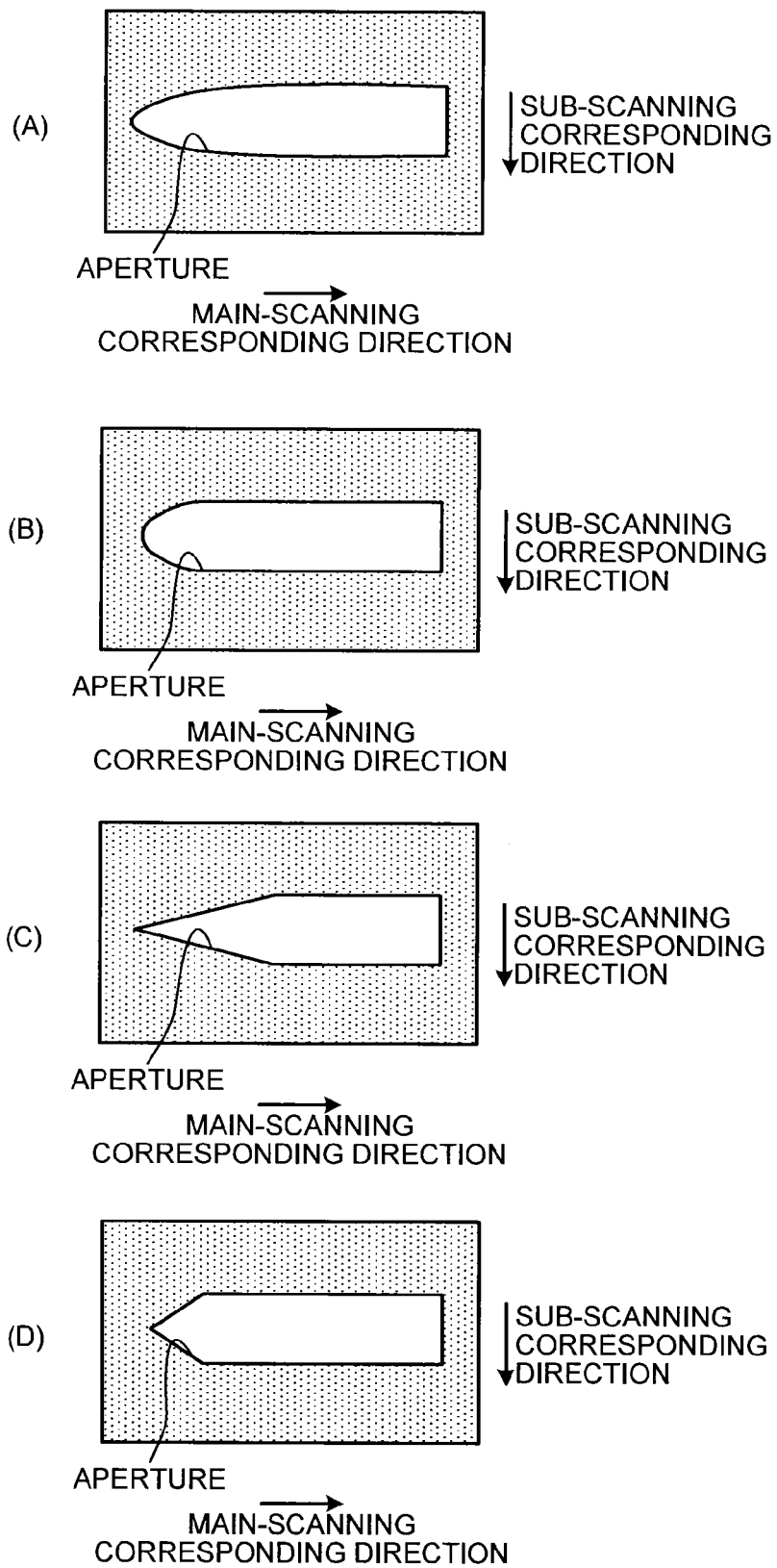
FIG. 35 illustrates examples of an aperture plate.

Meanwhile, when the incident light flux is "rejected" by the optical deflector 2104 at the timing at which the reflected light flux is directed to the scanning start position in the scanning region or at the timing at which the reflected light flux is directed to the scanning end position in the scanning region, the aperture of the aperture plate may have the shape in which the length (aperture width) in the sub-scanning corresponding direction becomes smaller at the end corresponding to the side where the incident light flux is "rejected" in the main-scanning corresponding direction than at the central portion in the main-scanning corresponding direction (see (A) to (D) of FIG. 35).

In addition, in the embodiments described above, a monolithic edge emitting laser array or a surface emitting laser array may be used as the light source.

Moreover, in the embodiments described above, the two light sources having the respective two light emitting units are used. However, the embodiments are not limited to this. For example, four light sources each having one light emitting unit may be used.

Further, in the embodiments described above, the multi-function peripheral is used as the image forming apparatus. However, the embodiments are not limited to this. The image forming apparatus may be a single copier, printer, or facsimile machine.

Furthermore, the image forming apparatus may be of a type that directly applies laser light to a medium (for example, a sheet) that is caused to produce a color by the laser light.

Furthermore, the image forming apparatus may be of a type that uses a silver halide film as an image carrier. In this case, a latent image is formed on the silver halide film by optical scanning, and is made visible by a process equivalent to the developing process of a general silver halide photographic process. Then, the latent image may be transferred onto a printing paper in a process equivalent to the printing process of the general silver halide photographic process. Such an image forming apparatus may be implemented as an optical printing plate apparatus or an optical drawing apparatus that draws a CT scan image or the like.

With an optical scanning apparatus according to the embodiments, it is possible to perform optical scanning on a scanning surface at high speed and with high accuracy without increasing a size and a cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus, comprising:
a light source; and
a rotational polygon mirror having N reflecting surfaces, the rotational polygon mirror being configured to reflect a light flux emitted from the light source so that a scanning surface is scanned along a main-scanning direction with the light flux reflected from the rotational polygon mirror, wherein
a width of the light flux incident on the rotational polygon mirror in a direction corresponding to the main-scanning direction is smaller than a width of each reflecting surface of the rotational polygon mirror in the direction corresponding to the main-scanning direction, and $$R < \frac{d_{in} \times \sqrt{1+\tan^2\theta_{in}}}{|\sin\theta_1 - \tan\theta_{in} \times \cos\theta_1 - \sin\theta_2 + \tan\theta_{in} \times \cos\theta_2|}$$

is satisfied in a plane orthogonal to a rotational axis of the rotational polygon mirror, where R is a radius of a circumscribing circle of the rotational polygon mirror, $d_{in}$ is a width of the light flux incident on the rotational polygon mirror in the direction corresponding to the main-scanning direction, $\theta_{in}$ is an incident angle of the light flux with respect to a reference axis direction, the reference axis direction being orthogonal to the rotational axis of the rotational polygon mirror, $\theta_1 = (\theta_{in}+\theta_s)/2 - 360/(2 \times N)$, and $\theta_2 = (\theta_{in}+\theta_e)/2 + 360/(2 \times N)$, where $\theta_s$ is an angle of view at a scanning start position, and $\theta_e$ is an angle of view at a scanning end position in a scanning region.

2. The optical scanning apparatus according to claim 1, wherein $$R > \frac{0.6 \times d_{in} \times \sqrt{1+\tan^2\theta_{in}}}{|\sin\theta_1 - \tan\theta_{in} \times \cos\theta_1 - \sin\theta_2 + \tan\theta_{in} \times \cos\theta_2|}$$

is satisfied.

3. The optical scanning apparatus according to claim 1, wherein
a sum of an absolute value of the incident angle $\theta_{in}$ and an absolute value of the angle of view $\theta_e$ at the scanning end position is smaller than 720/N.

4. The optical scanning apparatus according to claim 1, further comprising:
a first aperture element having an aperture for shaping the light flux emitted from the light source, the first aperture element being arranged on a light path between the light source and the rotational polygon mirror, wherein
the aperture has a shape in which an aperture width in a direction corresponding to a sub-scanning direction orthogonal to the main-scanning direction is smaller at least at one side end thereof than a central portion thereof in the direction corresponding to the main-scanning direction.

5. The optical scanning apparatus according to claim 4, further comprising:
a linear image forming optical system configured to converge a light beam directed to the rotational polygon mirror in the sub-scanning direction near the reflecting surface, the linear image forming optical system being provided on the light path between the light source and the rotational polygon mirror,
a second aperture element configured to restrict a width of the light beam directed to the rotational polygon mirror in the sub-scanning direction, the second aperture element being provided on the light path at a position closer to the light source than the linear image forming optical system, wherein
the rotational polygon mirror serves as an optical deflector,
the first aperture element is provided on the light path at a position closer to the reflecting surface than the linear image forming optical system, and
the first aperture element is smaller in size than a light-flux width of the incident light beam in the main-scanning direction and has an aperture shape in which the aperture width in the sub-scanning direction gradually decreases toward peripheral portions in the main-scanning direction.

6. The optical scanning apparatus according to claim 5, wherein $L < f - 0.5 \cdot f/a$ is satisfied,
where L is an interval between the linear image forming optical element and the first aperture element, f is a focal distance of the linear image forming optical element in the sub-scanning direction, and a is an aperture width of the second aperture element in the sub-scanning direction.

7. The optical scanning apparatus according to claim 5, wherein
one or more of the first aperture elements are positioned with respect to a reference axis of the optical deflector at least in the main-scanning direction, the reference axis of the optical deflector corresponds to the rotational axis of the optical deflector.

8. The optical scanning apparatus according to claim 5, wherein one or more of the first aperture elements are fixable at any position in the main-scanning direction with respect to the incident light beam.

9. The optical scanning apparatus according to claim 5, further comprising a synchronization detecting unit configured to adjust synchronization for optical scanning, wherein
a reflected light beam that is not partially reflected to the scanning surface optically scans the synchronization detecting unit.

10. The optical scanning apparatus according to claim 4, wherein
the light beam incident on the reflecting surface of the rotational polygon mirror is not partially reflected to the scanning surface when an end in a deflecting range of the light beam deflected to scan by the rotational polygon mirror is scanned, the first aperture element is formed such that the aperture width thereof in the sub-scanning direction gradually decreases from the central portion of the aperture to at least the one side end in the main-scanning direction, and a portion of the light beam not reflected to the scanning surface includes a portion of the light flux passing through at least the one side end of the aperture of the first aperture element in the main-scanning direction.

11. An image forming apparatus, comprising:

at least one image carrier; and the optical scanning apparatus according to claim 1, the optical scanning apparatus being configured to scan the at least one image carrier with the light flux modulated by image information.

\* \* \* \* \*